(12) United States Patent
Pham et al.

(10) Patent No.: US 9,457,335 B2
(45) Date of Patent: Oct. 4, 2016

(54) HYDRATION APPARATUS AND METHOD

(71) Applicant: SCHLUMBERGER TECHNOLOGY CORPORATION, Sugar Land, TX (US)

(72) Inventors: Hau Pham, Houston, TX (US); Rajesh Luharuka, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/536,415

(22) Filed: Nov. 7, 2014

(65) Prior Publication Data

US 2016/0129418 A1 May 12, 2016

(51) Int. Cl.
*B01J 19/24* (2006.01)
*E21B 41/00* (2006.01)
*B01J 19/18* (2006.01)

(52) U.S. Cl.
CPC ............... *B01J 19/24* (2013.01); *B01J 19/18* (2013.01); *B01J 19/245* (2013.01); *B01J 19/246* (2013.01);
(Continued)

(58) Field of Classification Search
CPC .... B01J 19/24; B01J 19/246; B01J 19/2405; B01J 19/245; B01J 19/2455; B01J 19/2445; B01J 19/243; B01J 19/2435; B01J 19/242; B01J 19/2425; B01F 5/06; B01F 5/0603; B01F 5/0604; B01F 5/0606; B01F 5/0608; B01F 5/0609; B01F 2005/002; B01F 2005/0022; B01F 2005/0629; B01F 2005/0638
See application file for complete search history.

(56) References Cited

U.S. PATENT DOCUMENTS 3,497,327 A * 2/1970 Kehse ............... B01J 19/006
261/113

(Continued)

OTHER PUBLICATIONS

International Search Report and Written Opinion issued in related International Application No. PCT/US2015/059177 mailed Feb. 17, 2016 (14 pages).

(Continued)

*Primary Examiner* — Lessanework Seifu
(74) *Attorney, Agent, or Firm* — Michael L. Flynn; Tim Curington

(57) ABSTRACT

Vessels including an enclosure having an outer perimeter and an interior space, a channel disposed in the interior space, a first port disposed on a surface of the first enclosure at or proximate to a first end of the channel, and a second port disposed on a surface of the first enclosure at or proximate to a second end of the channel, where the channel has a length greater than the shortest distance between the first port and the second port, and where the first port and the second port are in fluid communication with one another. In some cases, the length of the channel is greater than a length of the outer perimeter. Optionally, the vessel may have a second enclosure having an outer perimeter and an interior space with a second channel disposed in the interior space, a third port disposed on a surface of the second enclosure at or proximate to a first end of the second channel, and a fourth port disposed on a surface of the second enclosure at or proximate to a second end of the second channel, where the second port, the third port and fourth port are in fluid communication. In yet some other optional variations, the vessel further includes a plurality of enclosures each having an outer perimeter and an interior space, a channel disposed in the interior space, a port disposed on a surface of the enclosure at or proximate to a first end of the channel, and a port disposed on a surface of the enclosure at or proximate to a second end of the channel, where the channel has a length greater than a shortest distance between the ports, and the second port and the ports disposed on the surface of the plurality of enclosures are in fluid communication. The perimeter shape of the enclosure(s) may be any suitable shape, including, but not limited to, substantially circular, ovate or rectangular.

71 Claims, 25 Drawing Sheets

(52) U.S. Cl.
CPC ........... *B01J 19/248* (2013.01); *B01J 19/2445* (2013.01); *E21B 41/00* (2013.01); *B01J 2219/192* (2013.01); *B01J 2219/1941* (2013.01); *B01J 2219/2401* (2013.01)

(56) References Cited

U.S. PATENT DOCUMENTS

| | | | | |
|---|---|---|---|---|
| 3,787,479 | A * | 1/1974 | Grehl | ............... C07C 67/03 422/213 |
| 5,190,374 | A | 3/1993 | Harms et al. | |
| 5,382,411 | A | 1/1995 | Allen | |
| 5,426,137 | A | 6/1995 | Allen | |
| 7,419,296 | B2 * | 9/2008 | Allen | ............... B01F 3/1221 366/164.6 |
| 7,866,881 | B2 | 1/2011 | El Kholy et al. | |
| 8,066,955 | B2 * | 11/2011 | Pinchot | ............... B01J 19/0093 228/103 |
| 2003/0150494 | A1 | 8/2003 | Morgan et al. | |
| 2004/0209780 | A1 | 10/2004 | Harris et al. | |
| 2004/0256106 | A1 | 12/2004 | Phillippi et al. | |
| 2006/0028914 | A1 | 2/2006 | Phillippi et al. | |
| 2006/0107998 | A1 | 5/2006 | Kholy et al. | |
| 2013/0150268 | A1 | 6/2013 | Oldham | |

OTHER PUBLICATIONS

International Search Report and Written Opinion issued in related International Application No. PCT/US2015/059182 mailed Feb. 29, 2016 (13 pages).

* cited by examiner

HYDRATION APPARATUS AND METHOD

FIELD

The disclosure generally relates to the preparation of subterranean formation treatment fluids, and more particularly, but not by way of limitation, apparatus and methods for preparing treatment fluids from a mixture including, in some cases, a hydratable material and water.

BACKGROUND

The statements in this section merely provide background information related to the disclosure and may not constitute prior art.

In the oil and gas drilling and production industry, viscous aqueous fluids are commonly used in treating subterranean wells, as well as carrier fluids. Such fluids may be used as fracturing fluids, acidizing fluids, and high-density completion fluids. In an operation known as well fracturing, such fluids are used to initiate and propagate underground fractures for increasing petroleum productivity.

Viscous fluids, such as gels, are typically an aqueous solution of a polymer material. A common continuous method used to prepare viscous fluids at a wellbore site, involves the use of initial slurry of the polymer material in a hydrocarbon carrier fluid (i.e. diesel fluid) which facilitates the polymer dispersion and slurry mixing. Although this process achieves the required gel quality, the presence of hydrocarbon fluids is often objected to in particular fields, even though the hydrocarbon represents a relatively small amount of the total fracturing gel once mixed with water. Also, there are environmental problems associated with the clean-up and disposal of both hydrocarbon-based concentrates and well treatment gels containing hydrocarbons; as well as with the clean-up of the tanks, piping, and other handling equipment which have been contaminated by the hydrocarbon-based gel.

Other applications used for the continuous mixing of viscous treatment gels include gelling the polymer in a hydrocarbon carrier that is mixed with water to produce the fracturing gel which is then flowed through baffled tanks providing first-in/first-out (FIFO) flow pattern, and allowing for the hydration time of the gel. Yet another technique for mixing of dry polymer directly to produce viscous treatment gels is described in Allen, U.S. Pat. No. 5,426,137, Allen, U.S. Pat. No. 5,382,411, and Harms et al., U.S. Pat. No. 5,190,374. These techniques, while potentially effective, require several complicated steps to prepare the gel, which presents drawbacks in an oilwell setting. Further, U.S. Patent Application 2004/0256106 A1 discloses an apparatus without an eductor, for substantially hydrating a gel particulate using a mixer in conjunction with an impeller located within the mixer housing, which prevents formation of gel balls.

Other techniques and equipment useful for the continuous mixing of viscous treatment gels without utilizing a hydratable polymer in a hydrocarbon are described in Pessin et al., U.S. Pat. No. 7,866,881, which discloses preparation of a viscous treatment gel from dry polymer utilizing a constant volume educator and mixing chimney, where the eductor operates at a constant water rate and pressure thus producing a concentrated polymer slurry. While effective in preparing an aqueous slurry from dry hydratable polymer and water, there still exists need to further minimize equipment size, space requirements, and efficiency.

Some hydration tanks configured in a first-in/first-out configuration are vented tanks which operate by use of gravity to flow a hydrating gel, formed of a polymeric viscosifier in aqueous solution, through the tank. As the polymer concentration in the gel increases, viscosity increases, and gravity flow of the gel is only possible up to a practical polymer concentration. As a result such systems are not useful to handle hydration of gels having a high concentration of viscosifier.

Therefore, there is a need for apparatus and methods useful for hydrating constituents at high concentrations to prepare viscous treatment gels in a continuous mode, without the use of hydrocarbon carriers, and with decreased equipment size and space requirements, such need met, at least in part, by the following disclosure.

SUMMARY

In a first aspect, an apparatus is disclosed which includes a first enclosure having an outer perimeter and an interior space defined therein, the first enclosure having a first continuous channel in the interior space, the first continuous channel having a channel-length greater than a length of the outer perimeter of the first enclosure, a first port disposed on the perimeter of the first enclosure in communication with a first end of the first continuous channel, and a second port disposed on a surface of the first enclosure in communication with a second end of the first continuous channel. The apparatus also includes a second enclosure having an outer perimeter and an interior space defined therein, the second enclosure having a second continuous channel in the interior space where the channel-length is greater than a length of the outer perimeter of the second enclosure, a third port disposed on a surface of the second enclosure in communication with a first end of the second continuous channel, and a fourth port disposed on the perimeter of the second enclosure in communication with a second end of the second continuous channel. The second port and the third port are in fluid communication.

The apparatus may further include a pair of intermediate enclosures disposed between the first enclosure and the second enclosure, the pair of intermediate enclosures having a first intermediate enclosure having an outer perimeter and an interior space defined therein, the first intermediate enclosure including a continuous channel in the interior space having a channel-length greater than a length of the outer perimeter of the first intermediate enclosure, a port disposed on a surface of the first intermediate enclosure in communication with a first end of the continuous channel, and a port disposed on a surface of the first intermediate enclosure and located proximate the outer perimeter, the port in communication with a second end of the continuous channel. The apparatus may further include a second intermediate enclosure having an outer perimeter and an interior space defined therein, where the second intermediate enclosure has a continuous channel in the interior space having a channel-length greater than a length of the outer perimeter of the second intermediate enclosure, a port disposed on a surface of the second intermediate enclosure and located proximate the outer perimeter, the port in communication with a first end of the continuous channel and connected to the port disposed on the first intermediate enclosure in communication with the second end of the continuous channel of the first intermediate enclosure, and a port disposed on a surface of the second intermediate enclosure and located proximate the outer perimeter, the port in communication with a second end of the continuous channel. The first enclosure, the second enclosure, the first intermediate enclosure and the second intermediate enclosure may be substantially circular, rectangular, oval, triangular, or any suitable outer perimeter shape, and the continuous channels of the first enclosure, the second enclosure, the first intermediate enclosure and the second intermediate enclosure may be orientated in a spiral configuration. In some instances, a first fluid flowpath is in a progressively inward direction through the continuous channels of the first enclosure and the second intermediate enclosure, and a second fluid flowpath is in a progressively outward direction through the continuous channels of the second enclosure and the first intermediate enclosure.

Alternatively, the apparatus may include a third continuous channel in the interior space having a channel-length greater than the length of the outer perimeter of the first enclosure, with a first end of the third continuous channel disposed at or proximate to a port, and a fifth port disposed at or proximate to a second end of the third continuous channel. The second port, the third port, and the fifth port are in fluid communication. The first enclosure may further have at least one pair of continuous channels in the interior space, the pair of continuous channels including a fourth continuous channel having a channel-length greater than a length of the outer perimeter of the first enclosure, a first end at or proximate to a port, and a sixth port disposed at or proximate to a second end. In addition, the apparatus may include a fifth continuous channel having a channel-length greater than a length of the outer perimeter of the first enclosure, a first end at or proximate to the sixth port, and a seventh port disposed at or proximate to a second end. The second port, the third port, the fifth port, the sixth port and the seventh port are in fluid communication. In some cases, the first enclosure further includes two pair of continuous channels in the interior space.

In another aspect of the disclosure, hydration vessels are disclosed, which include an inlet chamber having an outer perimeter and a first fluid passageway formed therein, where the length of the first fluid passageway is greater than a length of the outer perimeter and wherein the first fluid passageway is inwardly or outwardly spiraling, a discharge chamber having an outer perimeter and a second fluid passageway formed therein, wherein the length of the second fluid passageway is greater than a length of the outer perimeter and wherein the second fluid passageway is inwardly or outwardly spiraling. In some aspects, at least one intermediate chamber may be disposed between the inlet chamber and the discharge chamber. The first fluid passageway and the second fluid passageway are in fluid communication. The outer perimeter shape of the chambers may be substantially circular, rectangular, ovate, triangular, or any other suitable shape.

In some cases the at least one intermediate chamber of the hydration vessel is a pair of intermediate chambers, where the first intermediate chamber includes an outer perimeter and a first intermediate fluid passageway therein, and where the length of the first intermediate fluid passageway is greater than a length of the outer perimeter and is outwardly spiraling. The second intermediate chamber has an outer perimeter and a second intermediate fluid passageway therein, the length of the second intermediate fluid passageway greater than a length of the outer perimeter, and the second fluid passageway is inwardly spiraling.

In some other cases, the inlet chamber, the discharge chamber, and at least one intermediate chamber of the hydration vessel each include a first and a second continuous channel, where the continuous channels are partitioned by a plate having a hole therein, and where the first and the second continuous channel are in fluid communication. A first fluid flowpath within each chamber is in a progressively inward direction through the first continuous channel, and a second fluid flowpath is in a progressively outward direction through the second continuous channel. The first and second continuous channels may be orientated in a substantially spiral configuration.

Alternatively, the inlet chamber of the apparatus may include a third fluid passageway formed therein, where the length of the third fluid passageway is outwardly spiraling and greater than the length of the outer perimeter, and the first fluid passageway, the second fluid passageway and the third fluid passageway are in fluid communication. In some aspects, the inlet chamber may further have at least one pair of fluid passageways in the interior space, where the pair fluid passageways have a fourth fluid passageway, inwardly spiraling, having a channel-length greater than a length of the outer perimeter, and a fifth outwardly spiraling fluid passageway having a channel-length greater than a length of the outer perimeter, where the first fluid passageway, the second fluid passageway, the third fluid passageway, the fourth fluid passageway and the fifth fluid passageway are in fluid communication. In some cases, the inlet chamber includes two such pair of fluid passageways in the interior space.

In yet another aspect of the disclosure, a hydration vessel includes a first outer chamber including an inlet port, a second outer chamber including a discharge port, and at least one intermediate chamber including a first port and a second port, where the at least one intermediate chamber is disposed between the first outer chamber and the second outer chamber. The first outer chamber, the second outer chamber, and at least one intermediate chamber each have a perimeter and contain at least one continuous channel therein, and each continuous channel has a length greater than the length of the respective chamber perimeter, and each continuous channel is disposed substantially parallel with each of the perimeters. The inlet port, the discharge port, and the continuous channels are in fluid communication. The chambers may be substantially circular, rectangular, ovate or triangular in outer perimeter shape.

In some embodiments, the first outer chamber, the second outer chamber, and the at least one intermediate chamber of the hydration vessel each have a first and a second continuous channel disposed therein, where the continuous channels are portioned by a plate having a hole therein, and the first and the second continuous channel are in fluid communication. A first fluid flowpath is in a progressively inward direction through the first continuous channel, and a second fluid flowpath is in a progressively outward direction through the second continuous channel. The first and second continuous channels may be orientated in a substantially spiral configuration in some cases.

In some other embodiments, the at least one intermediate chamber of the hydration vessel is a pair of intermediate chambers. Each intermediate chamber contains one continuous channel therein. Fluid flowpaths within the continuous channels of the intermediate chambers may alternate in an outwardly spiraling/inwardly spiraling fashion as mixtures travel through the sequence of pair(s) of intermediate chambers.

Alternatively, the hydration vessel further includes a pair of intermediate chambers disposed between the first outer chamber and the at least one intermediate chamber, where each intermediate chamber of the pair of intermediate chambers has a perimeter and contain at least one continuous channel therein. Each continuous channel has a length greater than a length of the perimeter, each continuous channel is disposed substantially parallel with each of the perimeters, and the inlet port, the discharge port, and the continuous channels are in fluid communication. In some aspects, the hydration vessel also has a second pair of intermediate chambers disposed between the pair of intermediate chambers and the second outer chamber, where each intermediate chamber of the second pair of intermediate chambers has a perimeter and contains at least one continuous channel therein; each continuous channel has a length greater than a length of the perimeter, and each continuous channel is disposed substantially parallel with each of the perimeters; and the inlet port, the discharge port, and the continuous channels are in fluid communication. In yet another aspect, a third pair of intermediate chambers is disposed between the second pair of intermediate chambers and the second outer chamber, each intermediate chamber of the third pair of intermediate chambers has a perimeter and contains at least one continuous channel, each continuous channel has a length greater than a length of the perimeter, each continuous channel is disposed substantially parallel with each of the perimeters, and the inlet port, the discharge port, and the continuous channels are in fluid communication.

Another aspect of the disclosure is a method for treating at least a portion of a subterranean formation penetrated by a wellbore, the method including introducing into at least one hydration vessel a mixture of a liquid component containing water, a solid component containing a hydratable material, then passing the mixture through the at least one hydration vessel in a continuous manner to form a slurry. A treatment fluid is then prepared which includes the slurry and an optional insoluble particle, and the fluid introduced into the wellbore to treat the subterranean formation. The hydration vessel includes an inlet chamber an inwardly spiraling first fluid passageway, and a discharge chamber having an outwardly spiraling second fluid passageway. In some embodiments, at least one intermediate chamber may be disposed between the inlet chamber and the discharge chamber.

In some embodiments where there is at least one intermediate chamber, the at least one intermediate chamber is a pair of intermediate chambers, where a first intermediate chamber of the pair has an outwardly spiraling first intermediate fluid passageway, the second intermediate chamber of the pair has an inwardly spiraling second intermediate fluid passageway formed therein, and the first fluid passageway, the second fluid passageway, the first intermediate fluid passageway and the second intermediate fluid passageway are in fluid communication. In some other embodiments, the at least one intermediate chamber includes a first and a second continuous channel, where the continuous channels are partitioned by a plate having a hole therein, and the first and the second continuous channel are in fluid communication. Further, the first outer chamber and the second outer chamber may each have a first and a second continuous channel, the continuous channels are partitioned by a plate having a hole therein, and the first and the second continuous channels are in fluid communication. A first fluid flowpath may be in a progressively inward direction through the first continuous channels, and a second fluid flowpath may be in a progressively outward direction through the second continuous channels.

In some aspects, the disclosure also relates to a vessel(s) including an enclosure having an outer perimeter and an interior space, a channel disposed in the interior space, a first port disposed on a surface of the first enclosure at or proximate to a first end of the channel, and a second port disposed on a surface of the first enclosure at or proximate to a second end of the channel, where the channel has a length greater than the shortest distance between the first port and the second port, and where the first port and the second port are in fluid communication with one another. In some cases, the length of the channel is greater than a length of the outer perimeter. Optionally, the vessel may have a second enclosure having an outer perimeter and an interior space with a second channel disposed in the interior space, a third port disposed on a surface of the second enclosure at or proximate to a first end of the second channel, and a fourth port disposed on a surface of the second enclosure at or proximate to a second end of the second channel, where the second port, the third port and fourth port are in fluid communication. In yet some other optional variations, the vessel further includes a plurality of enclosures each having an outer perimeter and an interior space, a channel disposed in the interior space, a port disposed on a surface of the enclosure at or proximate to a first end of the channel, and a port disposed on a surface of the enclosure at or proximate to a second end of the channel, where the channel has a length greater than a shortest distance between the ports, and the second port and the ports disposed on the surface of the plurality of enclosures are in fluid communication. The perimeter shape of the enclosure(s) may be any suitable shape, including, but not limited to, substantially circular, ovate or rectangular. Additionally, the vessels may further include one or more static mixing elements disposed within the channel to introduce mixing at specific intervals or stages of chemical reaction.

Methods for treating at least a portion of a subterranean formation penetrated by a wellbore are also provided, which include introducing into one or more reaction vessels a mixture of a liquid component containing a first chemical reactant, and a second chemical reactant, and the mixture is passed through the at least one reaction vessel. A treatment fluid is then prepared and contains the mixture and an optional insoluble particle, and is subsequently introduced into a wellbore. The reaction vessel has a first enclosure having an outer perimeter and an interior space defined therein, a channel disposed in the interior space, a first port disposed on a surface of the first enclosure at or proximate to a first end of the channel, and a second port disposed on a surface of the first enclosure at or proximate to a second end of the channel. The channel may have a length greater than a shortest distance between the first port and the second port, and the first port and the second port are in fluid communication. In some cases, the channel has a length greater than a length of the outer perimeter.

Some other method embodiments according to the disclosure include methods for treating at least a portion of a subterranean formation penetrated by a wellbore where a liquid component comprising water and a second component comprising a hydratable polymer are introduced into at least one hydration vessel, the mixture passed through the at least one hydration vessel in a continuous manner to form a slurry, a treatment fluid then prepared which contains the slurry and an optional insoluble particle, and the treatment fluid introduced into the wellbore. The at least one hydration vessel includes an inlet chamber having a spiraling first fluid passageway, a discharge chamber having a spiraling second fluid passageway, where the first fluid passageway and the second fluid passageway are in fluid communication. In some cases, at least one intermediate chamber is disposed between the inlet chamber and the discharge chamber, where the intermediate chamber comprises a spiraling first intermediate fluid passageway, and the first fluid passageway, the second fluid passageway, and the first intermediate fluid passageway are in fluid communication.

Other method aspects of the disclosure relate to providing an apparatus including an inlet chamber having an outer perimeter and a first fluid passageway formed therein, where the first fluid passageway has a length greater than a shortest distance between the outer perimeter and center of the inlet chamber, and the apparatus further includes a discharge chamber having an outer perimeter and a second fluid passageway formed therein, where the second fluid passageway has a length greater than a shortest distance between the outer perimeter and center of the discharge chamber. The first fluid passageway and the second fluid passageway are in fluid communication. An admixture of a liquid component containing a first chemical and a second component is introduced into the apparatus, and flowed through the apparatus. A product formed from the first chemical and the second component is then discharged from the apparatus.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
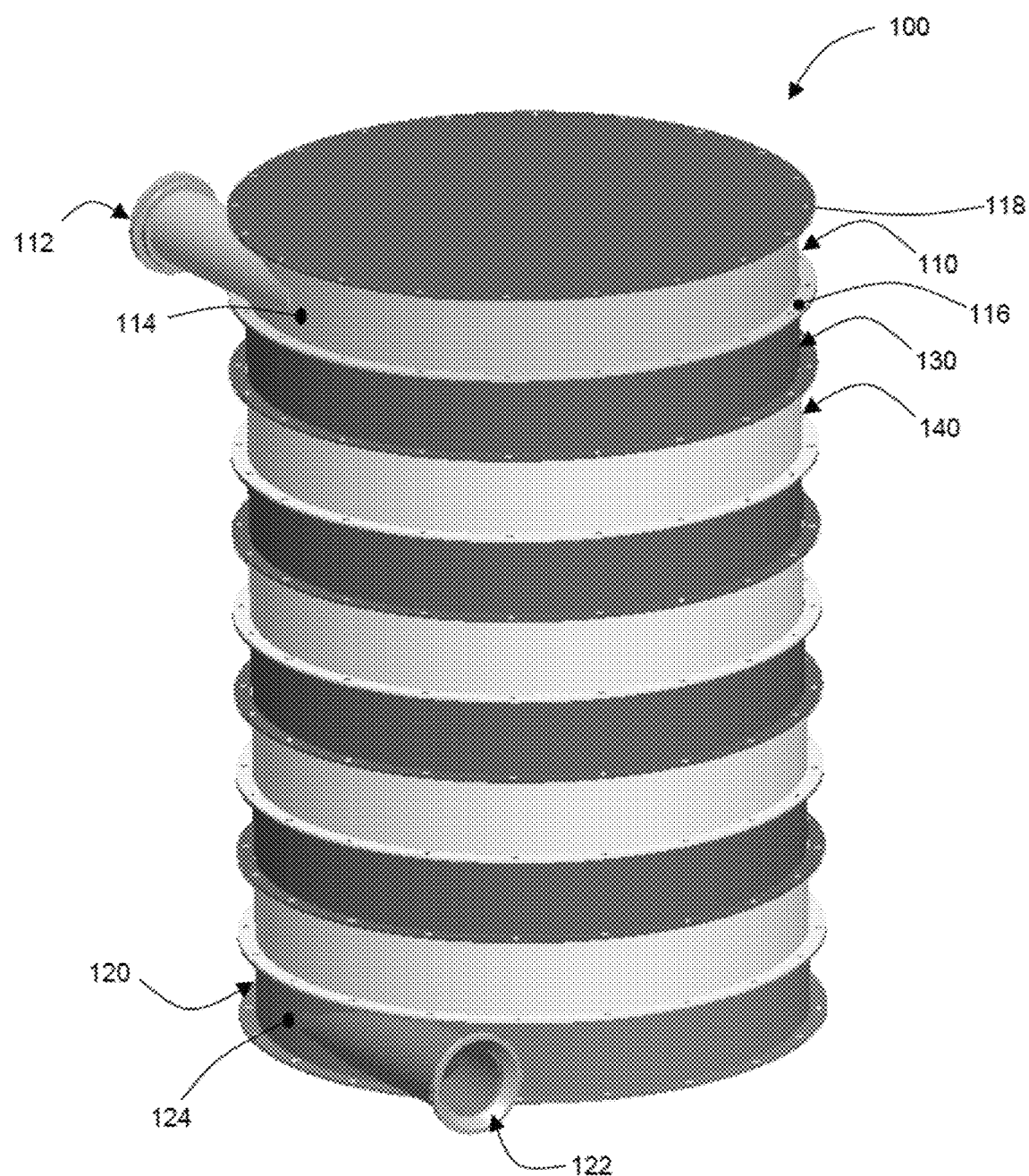
FIG. 1 illustrates some apparatus embodiments in accordance with the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless otherwise stated.

The terminology and phraseology used herein is for descriptive purposes and should not be construed as limiting in scope. Language such as "including," "comprising,"

"having," "containing," or "involving," and variations thereof, is intended to be broad and encompass the subject matter listed thereafter, equivalents, and additional subject matter not recited.

Finally, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

As used herein the term "enclosure" means a volume of space surrounded by outer surfaces of an apparatus, and is inclusive of such outer surfaces. The term "chamber" herein means a volume of space defined within outer surfaces of an apparatus. The term "channel" means a substantially enclosed elongated opening within a chamber or enclosure. The term "passageway" means a continuing volume of space which connects a first point to a second point within a chamber or enclosure. The phrase "outer perimeter" means the distance around a two-dimensional cross-sectional shape of a chamber or enclosure, and is not necessarily limited to such a dimension measured on the exterior or the interior of the apparatus.

Some aspects of the disclosure relate to apparatus for, and methods of, forming a solvated mixture, or suspension, of a solids portion and a liquid medium by increasing residence time of the mixture within the apparatus. Some other aspects relate to apparatus for, and methods of, forming a product of a chemical contained in a liquid component and a second component through increasing residence time of the admixture within the apparatus. Some other aspects relate to hydration of hydratable material by increasing residence time of a mixture of water and hydratable material within a hydration apparatus. The hydratable material may be a solid material, or other chemical, which is hydratable in an aqueous liquid, or even slurry of a hydratable material, which is mixed with the aqueous liquid portion. Some non-limiting examples of hydratable material include viscosifying polymers, friction reducers, viscoelastic surfactants, cement components, drilling fluid constituents, and the like. Some other aspects of the disclosure relate to apparatus and methods involving a flow of mixture of chemicals undergoing a rate limited chemical process, or reaction, requiring residence time with the help of a motive force such as gravity, pressure or a combination of both. The apparatus of the disclosure, as well as use thereof, are useful in preparing a fluid from a mixture containing one or more materials which may react in any way, including association, such as surfactant, polymer or solids separation and association with water in hydration, or even chemical reaction to form another material through ionic or covalent bonding. As such, apparatus of the disclosure may be referred to as hydration or reaction vessels. The apparatus and methods may also be applied where a first-in/first-out (FIFO) process is used where different chemicals are introduced in sequence, and where time for a chemical reaction to complete, or substantially complete, is allowed before a second chemical is added to the flow.

Residence time within the apparatus may be improved, or extended, by directing the fluid mixtures through the apparatus via one or a plurality of chambers, or otherwise interior spaces, formed within an enclosure, or enclosures. In some aspects, the directing of the mixture may be accomplished by passing the mixture through a continuous channel or passageway which has a length greater than a distance between the perimeter and center of a chamber, or even a length greater than the outer perimeter of the chamber, or interior space of the enclosure. In some embodiments, the mixture is passed through a plurality of successive fluidly connected channels or passageways. The channel or passageway, or plurality of channels or passageways, are fluidly connected with an inlet and outlet of the apparatus. A mixture may be introduced into the apparatus, flow in a nonlinear pattern through the apparatus, and subsequently discharge in a greater hydrated, solvated or suspended state. In some embodiments, channels or passageways are disposed on opposing sides of a structure within the apparatus, where each side of the structure imparts turbulent flow characteristics into the mixture as it passes through the channels or passageways, which may in turn provide a reduction in requisite equipment volume to achieve suitable mixing or hydration. The figures and description only depict how some embodiments may be enabled and function in a practical sense within the spirit of the concept of disclosure, and the concept is not solely limited to the embodiments described.

In some embodiments of the disclosure, preparation of subterranean formation treatment fluids, and more particularly, but not by way of limitation, apparatus and methods for preparing a viscous gel from essentially dry hydratable polymer constituents and water in a continuous mode are described. In some cases, the apparatus and methods are useful for preparing a viscous hydrated gel from dry polymer at a wellbore site for fracturing a subterranean formation. Some embodiments of the disclosure relate to first-in/first-out gel hydration vessels which provide effective polymer hydration by forcing a hydratable polymer and fluid mixture to sweep a significant volume of a hydration vessel. The volumetric capacity may be determined by the desired polymer concentration, the required hydration time for the polymer concentration, and the desired rate of hydrated polymer slurry production. In some aspects, the vessel design may be a pressure vessel design comprised of a series of flanged spiral-partitioned modular components that are affixed with one another to form a staged assembly. In some embodiments, a pressurized polymer/fluid mixture may be introduced into the vessel by a tangentially located inlet port on the vessel, and may flow in a spiral direction toward the center of the vessel within that stage, move to the next stage level and flow in spiral direction outwardly from the center, move to the next stage level and flow in a spiral direction inward toward the center, and so on, until an at least partially, if not fully hydrated polymer slurry, emerges from an outlet. By enabling the mixture to flow in a substantially spiral direction from stage to stage, pressure drops within the staged assembly due to flow direction reversal are minimized, thus allowing for more efficient power requirements to sustain the mixture flow through the vessel. Additionally, in some embodiments, more than one of these staged vessel assemblies may be connected to each other in series to effectively increase the volume through which the polymer/fluid mixture sweep through the vessels, in first-in/first-out fashion, to achieve the desired hydration for a given polymer concentration, flow rate, and required hydration time.

As used herein: the term "gel" means any liquid material in a viscous state suitable for any number of applications known in the art, including, but not limited to, treating a wellbore; "dry polymer", "hydratable polymer", "hydratable material" may mean, in some cases, any form of polymer material which is commercially available, transferred, or supplied, in a solid, slurried and/or coated form (crystalline, amorphous, or otherwise), and not necessarily in an aqueous or non-aqueous solution or slurry, and may be any polymer type useful for well treatments, including, but not limited to, guar gums, which are high-molecular weight polysaccharides composed of mannose and galactose sugars, or guar derivatives such as hydroxypropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, may also be useful as polymers in accordance with the disclosure. Synthetic polymers such as, but not limited to, polyacrylamide and polyacrylate polymers and copolymers, used typically for high-temperature and/or friction reduction applications, may also be used. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in published application U.S. 20040209780A1, Harris et. al. Any dry polymer may contain commercially acceptable moisture levels, or have a coating or pre-treatment. The term "gel" may also mean a slurry of partial or fully hydrated polymer in water. Hydratable material may also include other types of viscosifying agents, such as viscoelastic surfactants, or silicates, for example.

In some aspects of the disclosure, the liquid portion of a mixture may be an aqueous medium which can include, for example, produced water, fresh water, seawater, brine or a combination thereof. In embodiments in which the aqueous medium includes brine, the brine can be, for example, water including an inorganic salt, organic salt or a combination thereof. Suitable inorganic salts can include alkali metal halides such as potassium chloride. The brine phase can include an organic salt such as sodium or potassium formate, or sodium or potassium salicylate. Suitable inorganic divalent salts can include calcium halides such as calcium chloride, calcium bromide or a combination thereof. Sodium bromide, potassium bromide, or cesium bromide can be used, either alone or in combination. The salt can be chosen for compatibility reasons.

Further, as used herein, the term "slurry" or "slurries" means any fluid mixture of the respective hydratable material with a liquid, which may flow under low shear condition and is also capable of being pumped under pressure. Generally, to form the slurry, a mixture of the hydratable material and liquid are introduced into apparatus according to the disclosure, subject to a suitable hydration residence time with the apparatus, and discharged from the apparatus where the hydratable material is at least partially hydrated. The unique interior design features of the apparatus enable significantly improved hydration effectiveness compared to traditional hydration tanks with like volumetric space.

Now referring generally to FIG. 1, which illustrates some apparatus embodiments according to the disclosure. FIG. 1 shows an apparatus useful for hydrating a mixture of water and a hydratable material, such as hydratable polymers used to viscosify and/or reduce the turbulent flow properties of a subterranean formation treatment fluid. Apparatus 100, which may be a vessel for at least partially hydrating, includes a first enclosure 110 and may further include a second enclosure 120. In some aspects of the disclosure, apparatus 100 may further include one or more intermediate enclosures 130, 140 (eight shown). Apparatus 100 may further include a port 112 disposed on the perimeter 114 of the first enclosure 110. Port 112 may receive the mixture of water and a hydratable polymer, or any suitable mixture liquid and solid, for blending, or otherwise further mixing, to form a slurry. Port 122 may also be disposed on the perimeter 124 of the second enclosure 120 of apparatus 100, and may produce, or otherwise discharge a slurry of liquid and polymer, such as water and hydratable material, or any desired mixture of materials in a liquid medium. Ports 112 and 122 may be flush or extend outward from perimeters 114 and 124, and in some instances, may extend outward in tangential direction relative perimeters 114 and 124. In some aspects, the enclosures 110, 120, 130, and 140 are separate chambers, through which the mixture travels a distance over a time period for hydration. The enclosures, or chambers, are in fluid communication which allows the mixture to pass from port 112, through first enclosure 110, then into any intermediate enclosure(s), then into second enclosure 120, and finally out of port 122.

Figure 2:
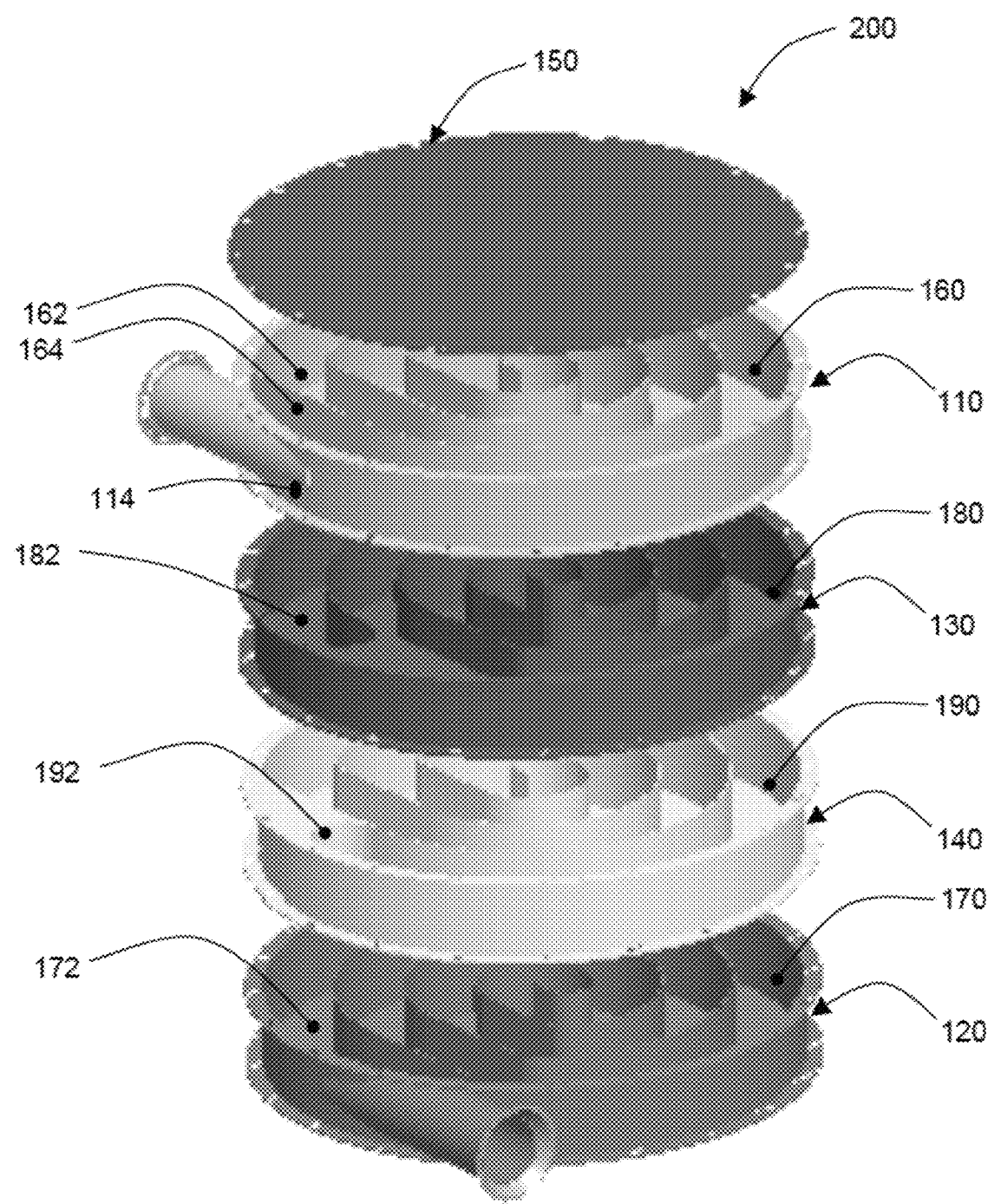
FIG. 2 depicts an exploded plan view of a hydration vessel in accordance with the disclosure.

Apparatus 100 may further include first plate 150 (as shown in FIG. 2) which is affixed to first enclosure 110, which may serve to help confine the mixture within the enclosure while passing through first enclosure 110. First plate 150 may be affixed to enclosure 110 by any suitable technique, including removable fasteners attaching with a flange of the enclosure, welding, formed as an integrated portion of enclosure 110, and the like. Likewise, enclosures 110, 130 and 120 may affixed with one another by same or similar techniques. In FIG. 1, the enclosures shown each include a flange extending from the top and bottom perimeters (116 and 118 for example), for receiving fasteners, such as nuts and bolts, and securing the enclosures (as well as plates where used) with one another.

Now referring to FIG. 2, which is an exploded plan view of vessel 200, according to some aspects of the disclosure. Enclosures 110, 120, 130 and 140 include interior spaces 160, 170, 180 and 190 defined within each enclosure. Within each interior space, at least one continuous channel, or fluid passageway, may be disposed, or otherwise formed, therein. The continuous channel, or fluid passageway may be of length greater than the length of the perimeter of the enclosure. For example, continuous channel 162 formed within the interior space 160 of enclosure 110, has a length greater than perimeter 114. Referencing FIG. 3, in those cases where the perimeter 114 is circular in shape, the length of perimeter 114 is the circumference of enclosure 110, where the circumference lies on a plane perpendicular to axial centerline 102. Similarly, in those instances where the shape of the perimeter is other than circular (i.e. rectangular, triangular, ovate, square, etc.), the perimeter length is the distance around the two-dimensional shape formed in a plane perpendicular to axial centerline.

Figure 3:
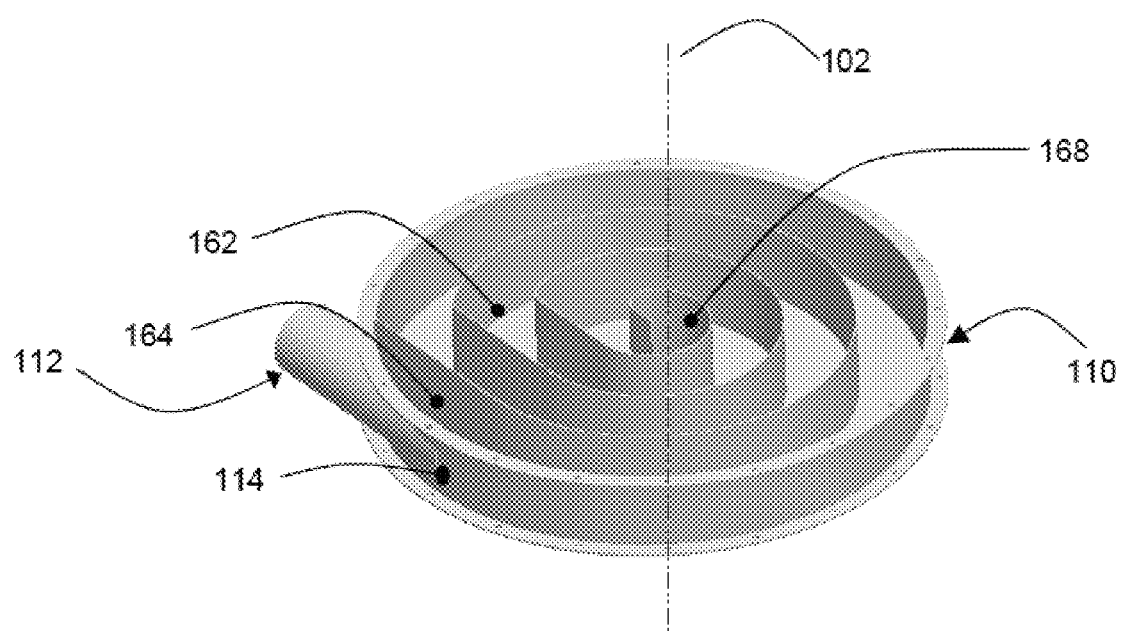
FIG. 3 shows a top plan view of an inlet chamber or enclosure in accordance with the disclosure.
Figure 4:
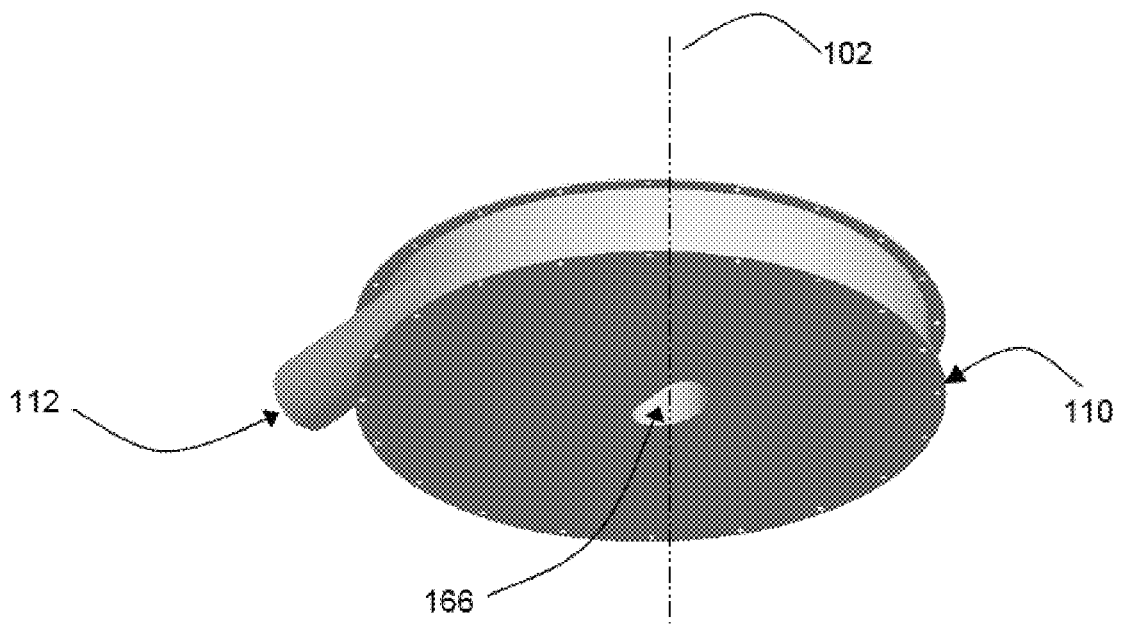
FIG. 4 depicts a bottom plan view of an inlet chamber or enclosure in accordance with the disclosure.

As shown in FIG. 2, interior spaces 160, 170, 180 and 190 include continuous channels or passageways 162, 172, 182 and 192, respectively. The continuous channels are orientated and connected in such way to enable ports 112 and 122 to be in fluid communication. To illustrate, referring to FIGS. 3 and 4, in some embodiments, first port 112 disposed on perimeter 114 is in fluid communication with the first end 164 of continuous channel 162, and another port 166 (shown in FIG. 4) is disposed on a surface of enclosure 110 is in communication with a second end 168 of continuous channel 162. FIG. 3 shows a top plan view, while FIG. 4 shows an opposing bottom plan view. A fluid mixture may be introduced into port 112, travel through continuous channel, or fluid passageway, 162, and exit, or otherwise discharge, enclosure 110 at port 166 positioned upon, or proximate, axial centerline 102. The mixture may then flow into a next enclosure, such as enclosure 120 or enclosure 180, for example. In some embodiments, the mixture flows from port 166 into enclosure 180, shown in FIG. 2.

Figure 5:
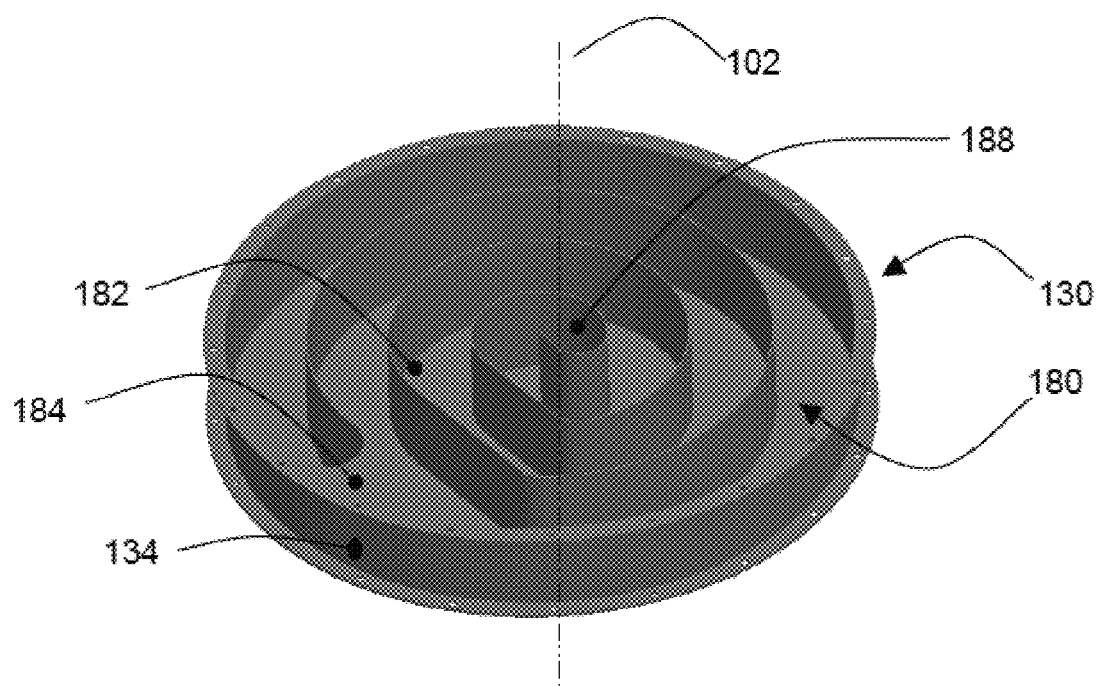
FIG. 5 illustrates a top plan view of an intermediate chamber or enclosure in accordance with the disclosure.
Figure 6:
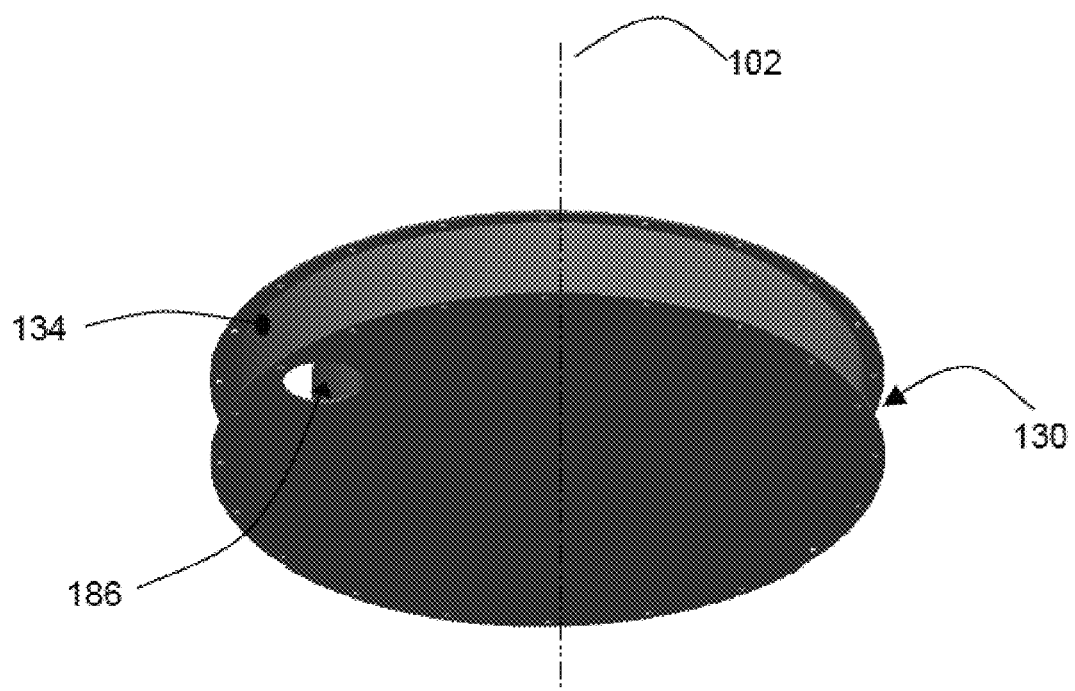
FIG. 6 shows a bottom plan view of an intermediate chamber or enclosure in accordance with the disclosure.
Figure 7:
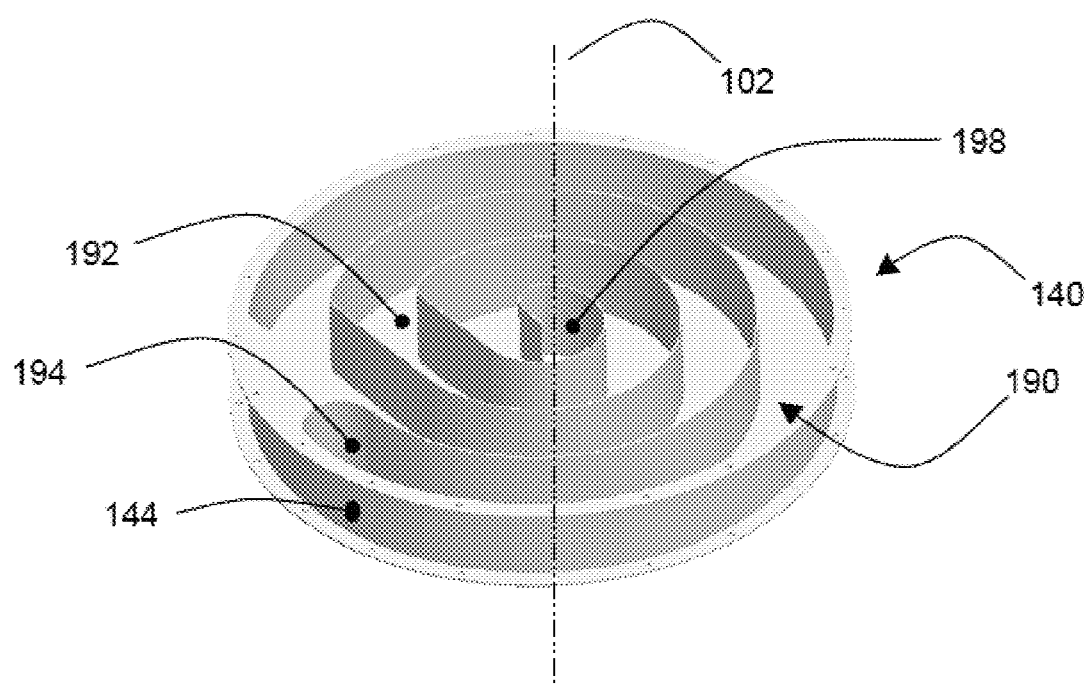
FIG. 7 illustrates a top plan view of another intermediate chamber or enclosure in accordance with the disclosure.
Figure 8:
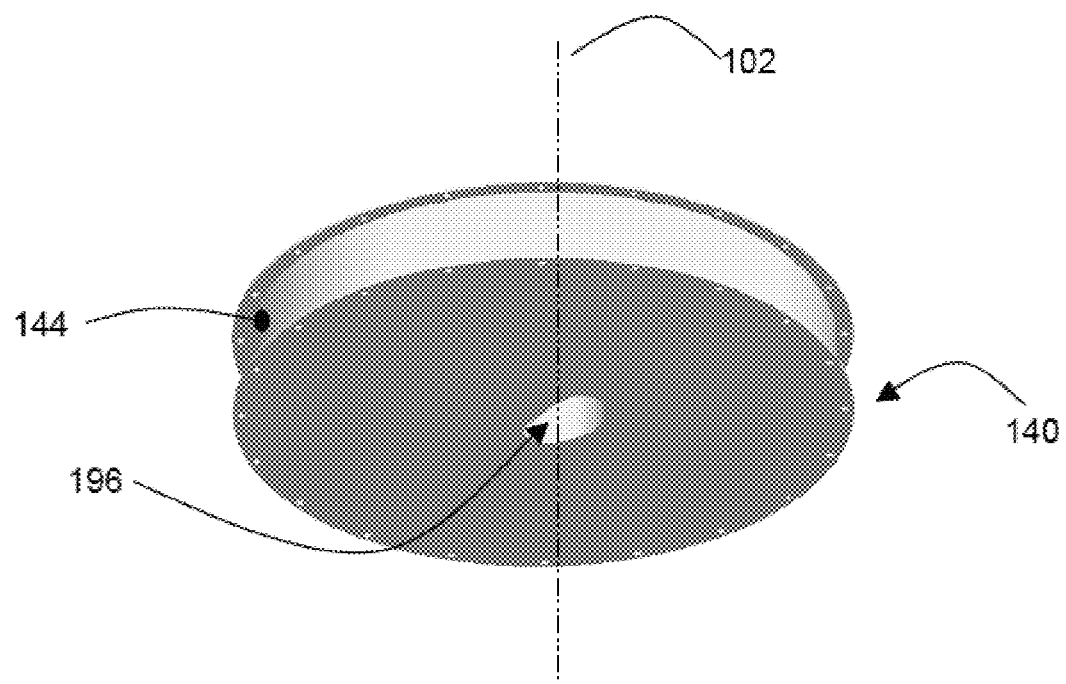
FIG. 8 depicts a bottom plan view of another intermediate chamber or enclosure in accordance with the disclosure.

Now referring to FIGS. 5 and 6, which show an intermediate enclosure, or chamber, in accordance with some aspects of the disclosure. FIG. 5 shows a top plan view, while FIG. 6 shows an opposing bottom plan view. Intermediate enclosure 130 includes continuous channel or passageway 182 within interior space 180. The center of enclosure 130 is positioned on axial centerline 102. A mixture may enter continuous channel 182 at or near axial centerline 102, at end 188. The mixture may be supplied from port 166 of enclosure 110, shown in FIG. 4, for example. Disposed on the opposing end 184 of channel 182 is port 186, which is positioned proximate perimeter 134. A mixture may exit enclosure 130 through port 186, and flow into a next enclosure, such as enclosure 140 shown in FIGS. 1 and 2. Referencing FIGS. 7 and 8, which illustrate another intermediate enclosure, or chamber, in accordance with some aspects of the disclosure, in top plan view (FIG. 7) and opposing bottom plan view (FIG. 8). Intermediate enclosure 140 includes channel 192 within interior spaces 190, and the center of enclosure 140 positioned on axial centerline 102. The mixture may be introduced into channel 192 at or near at end 194 proximate perimeter 144. The mixture may be supplied from port 186 of enclosure 130, shown in FIG. 6. The mixture travels through continuous channel 192, exits enclosure 140 through port 196, and flows into a next enclosure, such as enclosure 120 shown in FIGS. 1 and 2. Alternatively, one or more pair of like enclosures 130 and 140 could be disposed in similar fashion between enclosure 140 and enclosure 120, such as the three additional pair shown in FIG. 1. While some illustrations show one pair of intermediate enclosures, or intermediate chambers, while others show four pair intermediate enclosures/chambers, it is within the spirit and scope of the disclosure to include any suitable number of pairs of intermediate enclosures, or even no pair of enclosures, between enclosures 110 and 120. Further, enclosures 110 and 120 may also be considered inlet chambers and discharge chambers, respectively.

Figure 9:
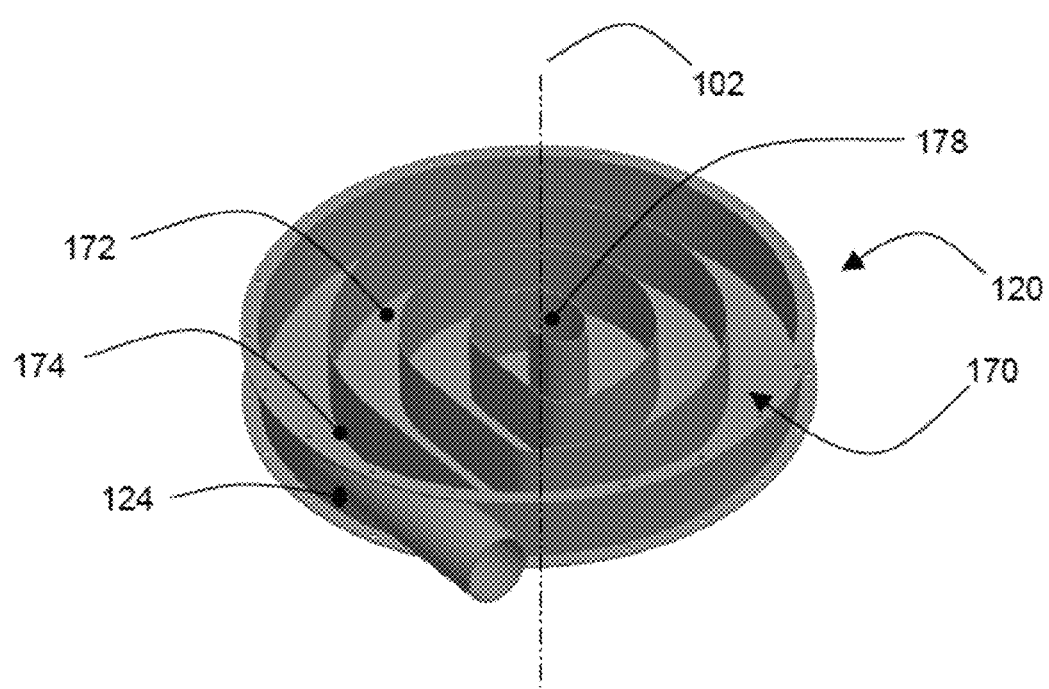
FIG. 9 illustrates a top plan view of a discharge chamber or enclosure in accordance with the disclosure.
Figure 10:
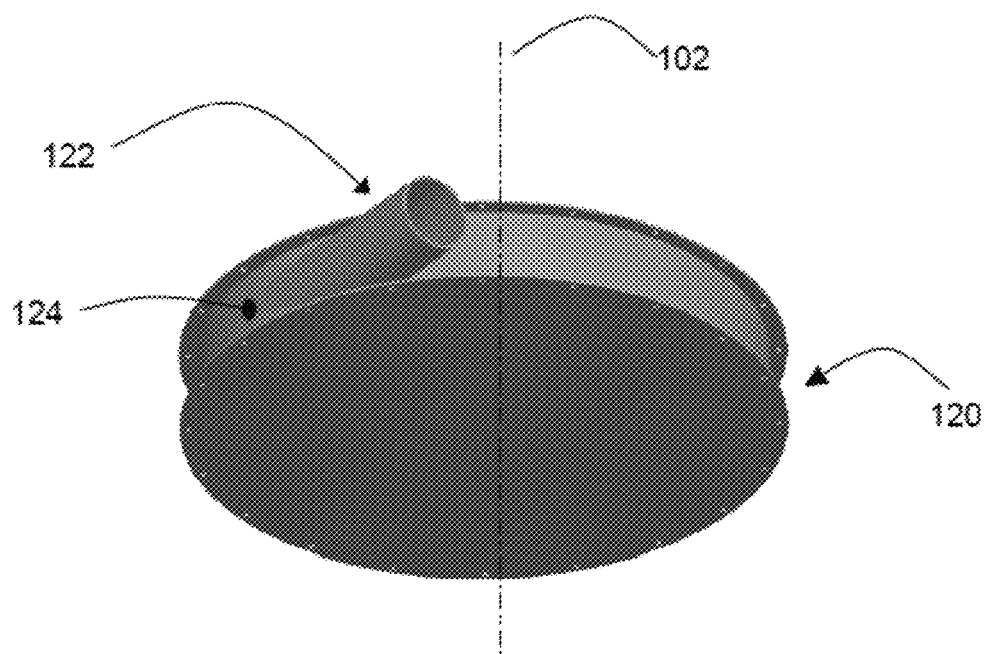
FIG. 10 shows a bottom plan view of a discharge chamber or enclosure in accordance with the disclosure.

Referencing FIGS. 9 and 10, which illustrate second enclosure 120 in top and bottom plan views. Second enclosure 120 includes continuous channel or passageway 172 within interior space 170. The center of enclosure 120 is positioned on axial centerline 102. A mixture may enter continuous channel 172 at or near axial centerline 102, at end 178, and the mixture may be supplied from port 196 of enclosure 140, shown in FIG. 8. Port 122 is disposed on the opposing end 174 of channel 172 which is positioned proximate perimeter 124. The mixture exits, or is otherwise discharged, from the second enclosure 120 through port 122, in a fully or partially slurried mixture of liquid and hydratable polymer, or even a product of an admixture in a liquid medium.

Figure 11:
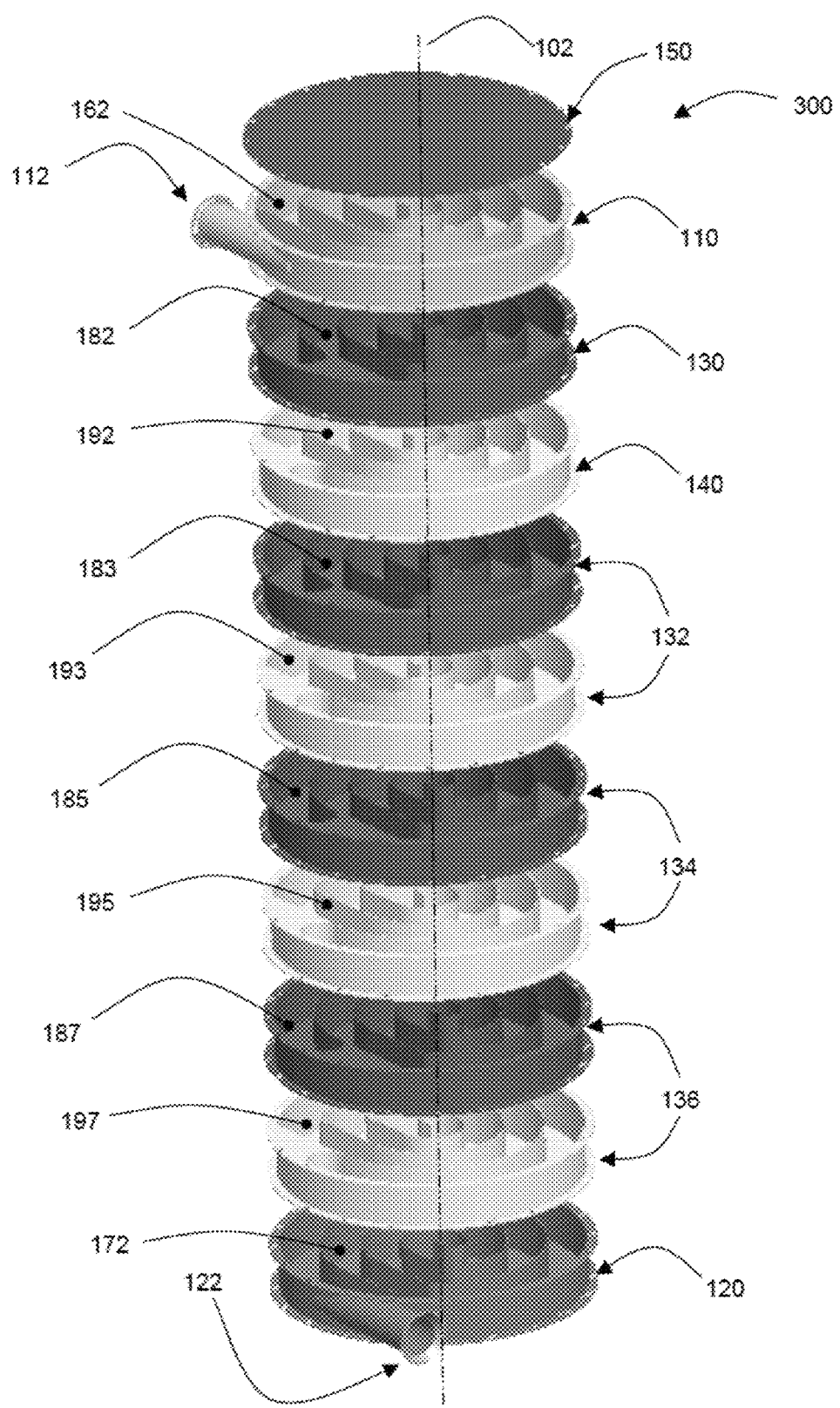
FIG. 11 illustrates a system of enclosures, or chambers, which are configured and constructed as depicted in FIGS. 1 through 10, in accordance with the disclosure.

FIG. 11 illustrates a system of enclosures, or chambers, which are configured and constructed as depicted in FIGS. 1 through 10, and described herein above. Apparatus, such as a hydration vessel, 300 includes enclosures 110, 120, 130 and 140, as well as pairs of intermediate enclosures 132, 134 and 136. Pairs of intermediate enclosures 132, 134 and 136, may be the same design as intermediate enclosures 130 and 140, in some aspects. Apparatus 300 further includes first plate 150 as part of enclosure 110, and ports 112 and 122. A fluid mixture may be introduced into the apparatus 112, travel through the system of continuous channels, or fluid passageways, of vessel 300, and discharge through port 122. The mixture introduced into port 112 may travel in a progressively inward direction toward the center of enclosure 110, while moving substantially parallel with the perimeter of enclosure 110. The mixture then transfers from enclosure 110 to intermediate enclosure 130, travels in a progressively outward direction toward the perimeter of enclosure 130, while moving substantially parallel with the perimeter, until transferring to enclosure 140. In vessel 140, the mixture travels in a progressively inward direction toward the center of enclosure 140, while moving substantially parallel with the perimeter of enclosure 140. The mixture then transfers to, and travels through each of the enclosures included in the pairs of enclosures 132, 134 and 136, in successive order, moving through the enclosures in the same fashion as described for enclosures 130 and 140. The mixture then transfers from the last pair of enclosures 136, into enclosure 120, travels in a progressively outward direction toward the perimeter of enclosure 120, while moving substantially parallel with the perimeter, until discharged through port 120. To summarize the order of travel through the channels or passageways, the mixture travels first through channel 162 in a progressively inward direction, then through 182 in a progressively outward direction, channel 192 in a progressively inward direction, channel 183 in a progressively outward direction, then channel 193 in a progressively inward direction, channel 185 in a progressively outward direction, then channel 195 in a progressively inward direction, then channel 187 in a progressively outward direction, channel 197 in a progressively inward direction, and then channel 172 in a progressively outward direction. The flow path of the mixture throughout apparatus 300 is in alternating inward/outward substantially spiral patterns which is illustrated in FIG. 11. While spiral or substantially spiral flow patterns are illustrated in some embodiments of the disclosure, any pattern of mixture flow which is movement substantially parallel with an enclosure perimeter while moving progressively inward or progressively outward, is within the scope of the disclosure. Also, the terms 'spiral' and 'substantially spiral', as used in the disclosure are not solely limited to patterns within a circle, but may also mean patterns within ovate, square, rectangular, triangular, and the like, perimeter enclosures where directional movement is progressively inward or progressively outward, and the length of the pattern, or otherwise pathway of movement, is at least greater than the distance formed between the center of the enclosure and greatest distance from the center on the perimeter of the enclosure. Some spiral patterns useful in some enclosure embodiments, or over a combination of multiple enclosures, may be variable pitch and multiple pitch. Also, the spiral pattern may be single pitched, such as an archimedean spiral, which is a plane curve generated by a point moving away from or toward a fixed point at a constant rate while the radius vector from the fixed point rotates at a constant rate.

In another aspect of the disclosure, vessels may have a single enclosure, such as 110 depicted in FIGS. 3 and 4, with a port 112 in fluid communication with the first end 164 of channel 162, and another port 166 disposed on a surface of enclosure 110 in fluid communication with a second end 168 of continuous channel 162. A fluid mixture may be introduced into port 112, travel through the channel, or fluid passageway, 162, and exit 110 at port 166. While enclosure 110 is shown in FIG. 3 as open, a cover, such as 150 in FIG. 2, may be disposed over the opening to seal the enclosure. The mixture may exit through port 166, or even a pipe or conduit disposed upon the port.

Figure 12:
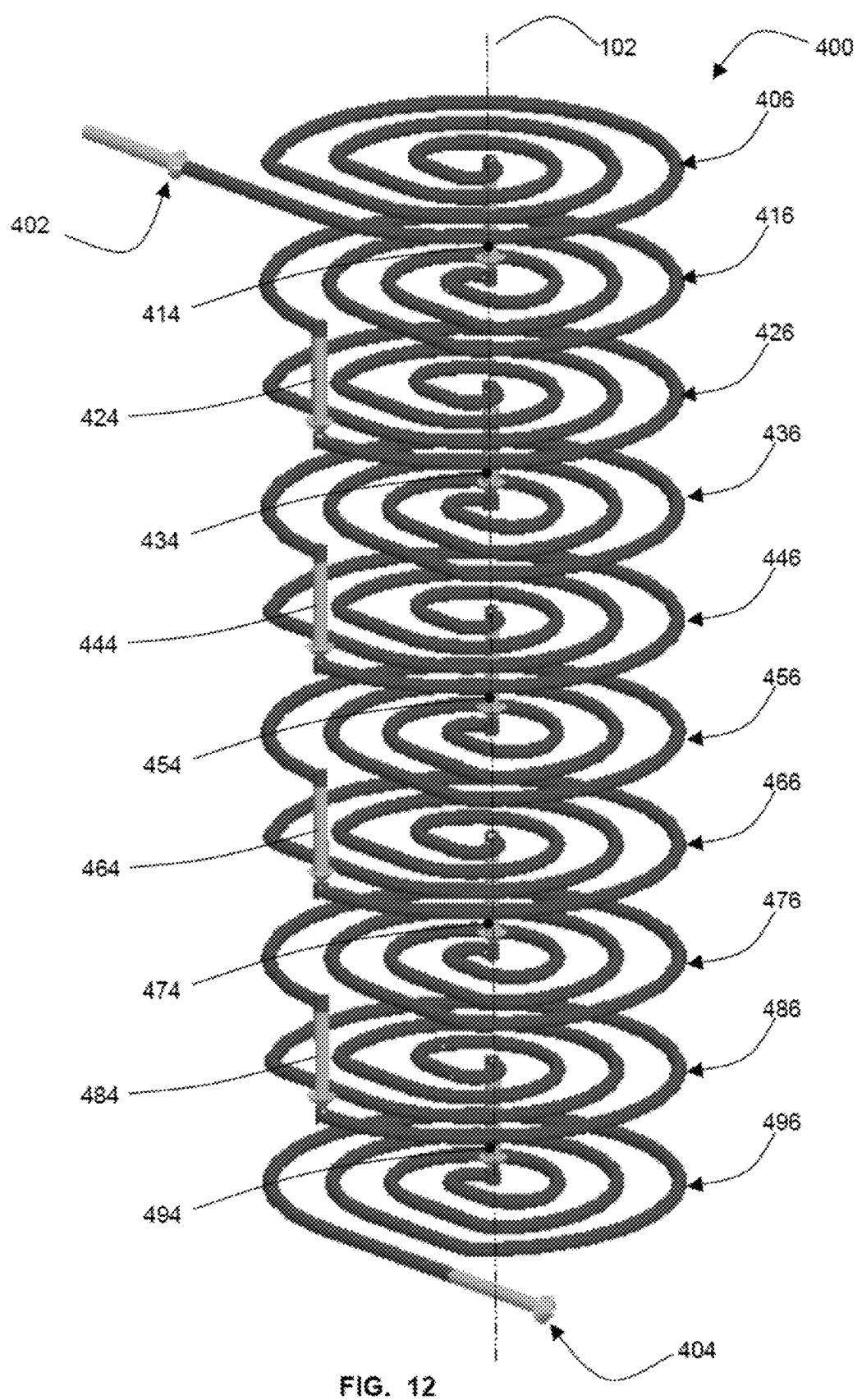
FIGS. 12 and 13 depict an alternating inward/outward substantially spiral mixture flow pattern through an apparatus, without showing the apparatus in FIG. 12, and showing the apparatus in a transparent shadowed form in FIG. 13, in accordance with the disclosure.
Figure 13:
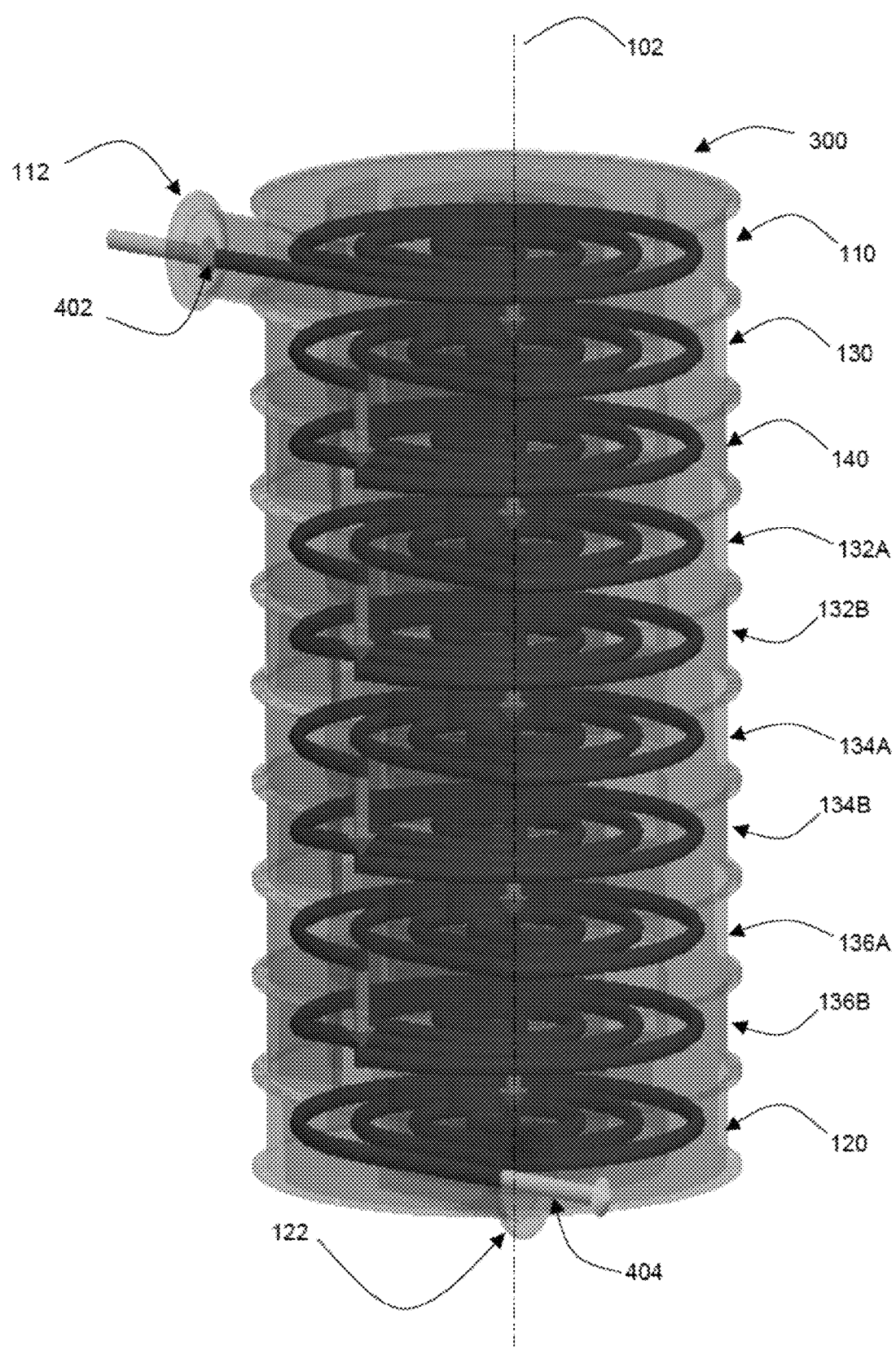

Now referencing FIGS. 12 and 13, which together, illustrate an alternating inward/outward substantially spiral mixture flow pattern 400 through apparatus 300, without showing apparatus 300 in FIG. 12, and showing apparatus 300 in a transparent shadowed form in FIG. 13. In accordance with the disclosure, the term 'substantially spiral', also referred to as 'spiral' herein, means the pattern of flow is spiral in nature, but may not be perfectly spiral due to enclosure design features and requirements, which would be readily apparent to those of skill in the art, given the benefit of this disclosure. The mixture is introduced into the inlet port 112 of chamber (or enclosure) 110 at point 402, then travels in an inwardly spiral direction 406 before transferring to the next chamber 130 at point 414. The mixture then moves outwardly spiraling 416 before transferring to the next chamber 140 at point 424, then inwardly spiraling 426, transferring into chamber 132A at point 434, outwardly spiraling 436, transferring to chamber 132B at 444, then inwardly spiraling 446, transferring into chamber 134A at point 454, then outwardly spiraling 456, transferring to chamber 134B at 464, inwardly spiraling 466, transferring into chamber 136A at point 474, outwardly spiraling 476, transferring to chamber 136B at 484, then inwardly spiraling 486, transferring to discharge chamber 120 at point 494, outwardly spiraling 496, and then discharging from the chamber 120 through discharge port 122 at point 404. As shown in FIG. 12, inner transfer points 414, 434, 454, 474 and 494 lie upon or proximate axial centerline 102 of the apparatus. However, it will be appreciated that the inner transfer points may lie at any suitable position within a chamber with the understanding that the inner transfer points are nearer the axial centerline of the apparatus than the transfer points positioned nearer the perimeter, such as outer transfer points 424, 444, 464 and 484. While it is shown in FIG. 12 example that first flowpath 406 may spiral in a counterclockwise direction relative axial centerline 102, and the next flowpath 416 may spiral in a counterclockwise direction, and so on, the flowpaths may also be in a clockwise direction. Also, it is within the scope of the disclosure that a first flowpath is in a clockwise direction, the second in a counterclockwise direction, and as applicable, subsequent directions alternating in the same way. The inverse is also applicable, such as counterclockwise first, clockwise second, etc. Further, the flowpath need not be limited to one direction, or alternate directions, and successive directions may be inconsistent, such as, for example, clockwise, clockwise, then counterclockwise, clockwise, counterclockwise, etc. Any suitable combination of directions may be used in accordance with the disclosure, and the disclosure is not limited in any arrangement of flowpaths.

Figure 14:
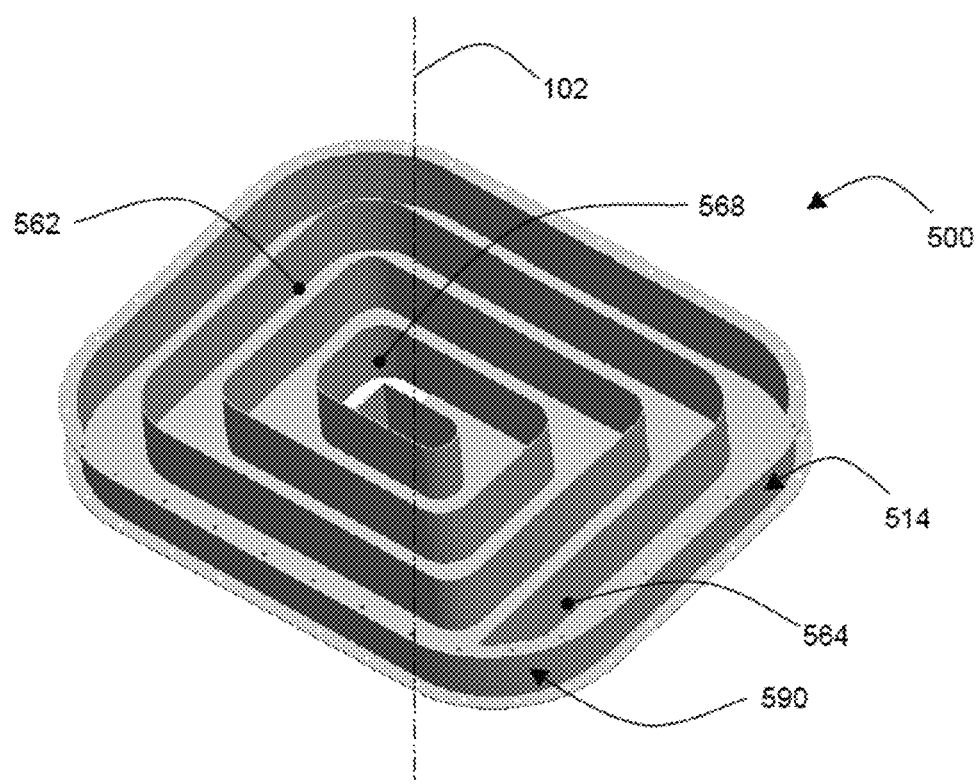
FIGS. 14 and 15 show a top and bottom view of a rectangular chamber or enclosure, in accordance with the disclosure.
Figure 15:
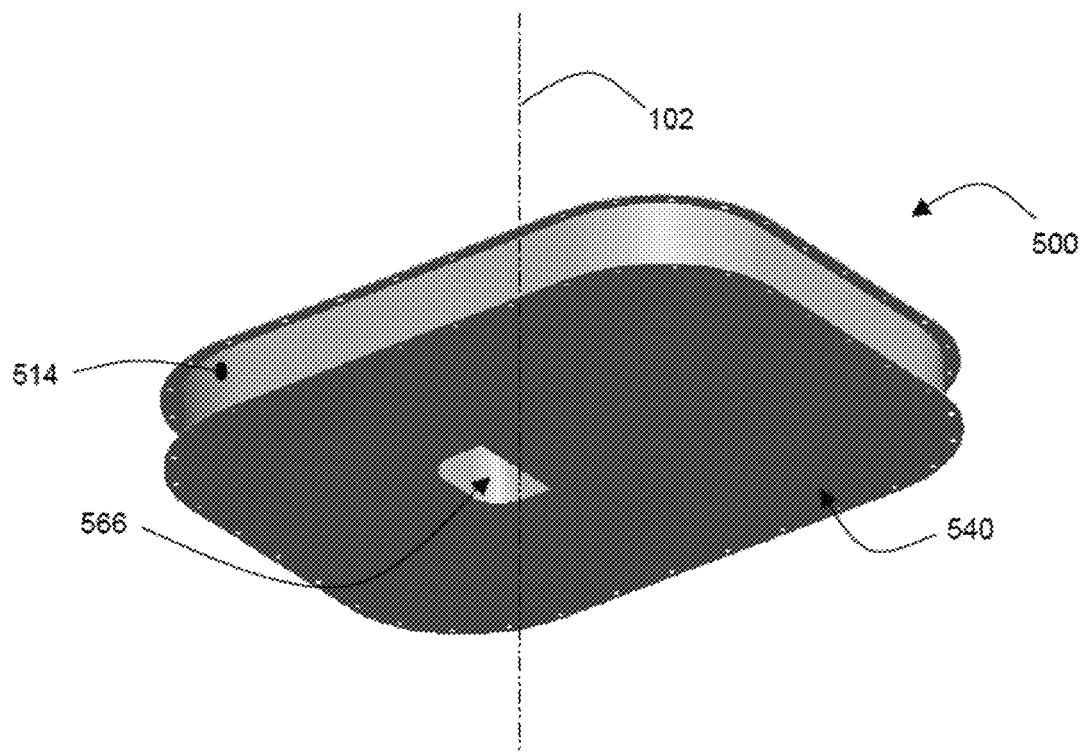

Referring now to FIGS. 14 and 15 which show a top and bottom view of a chamber according to some aspects of the disclosure. Chamber 500 has a substantially rectangular outer perimeter shape, in contrast to the circular chambers, or enclosures, shown in FIGS. 1 through 11. Other than the general difference in outer perimeter shape, the features and function of the components described for the vessels and enclosures illustrated in FIGS. 1 through 13 could be applied to a plurality of substantially rectangular chambers 500. To illustrate, chamber 500 may include a perimeter 514, and continuous channel, or fluid passageway, 562 with a first end 564 and second end 568. Second end 568 may be disposed upon or proximate axial centerline 102, while the first end 564 disposed proximate perimeter 514. A port 566 may be disposed on surface 540 of the chamber, and in fluid communication with a second end 568 of continuous channel 562. In those cases where chamber 500 is located at the inlet end of a hydration vessel, an inlet port may be disposed upon perimeter 514, proximate first end 564, at point 590, for example. Likewise, in instances where chamber 500 is located at the discharge end of a hydration vessel, a discharge port may be disposed upon perimeter 514, at point 590, and proximate first end 564. However, when chamber 500 is located at the discharge end, port 566 would not be disposed upon surface 540, as a fluid mixture would be received at second end 568 from a similar chamber disposed above chamber 500. Fluid passageway 562 may be of length greater than the length of the perimeter 514 of the chamber. The flow pattern of a mixture through fluid passageway 562 may substantially spiral in shape, or otherwise parallel with perimeter 514, in a plane perpendicular to centerline 102. While chamber 500 depicts a substantially rectangular shape, chamber perimeter shapes which are triangular, ovate, square, and the like, are within the scope of the disclosure.

Figure 16:
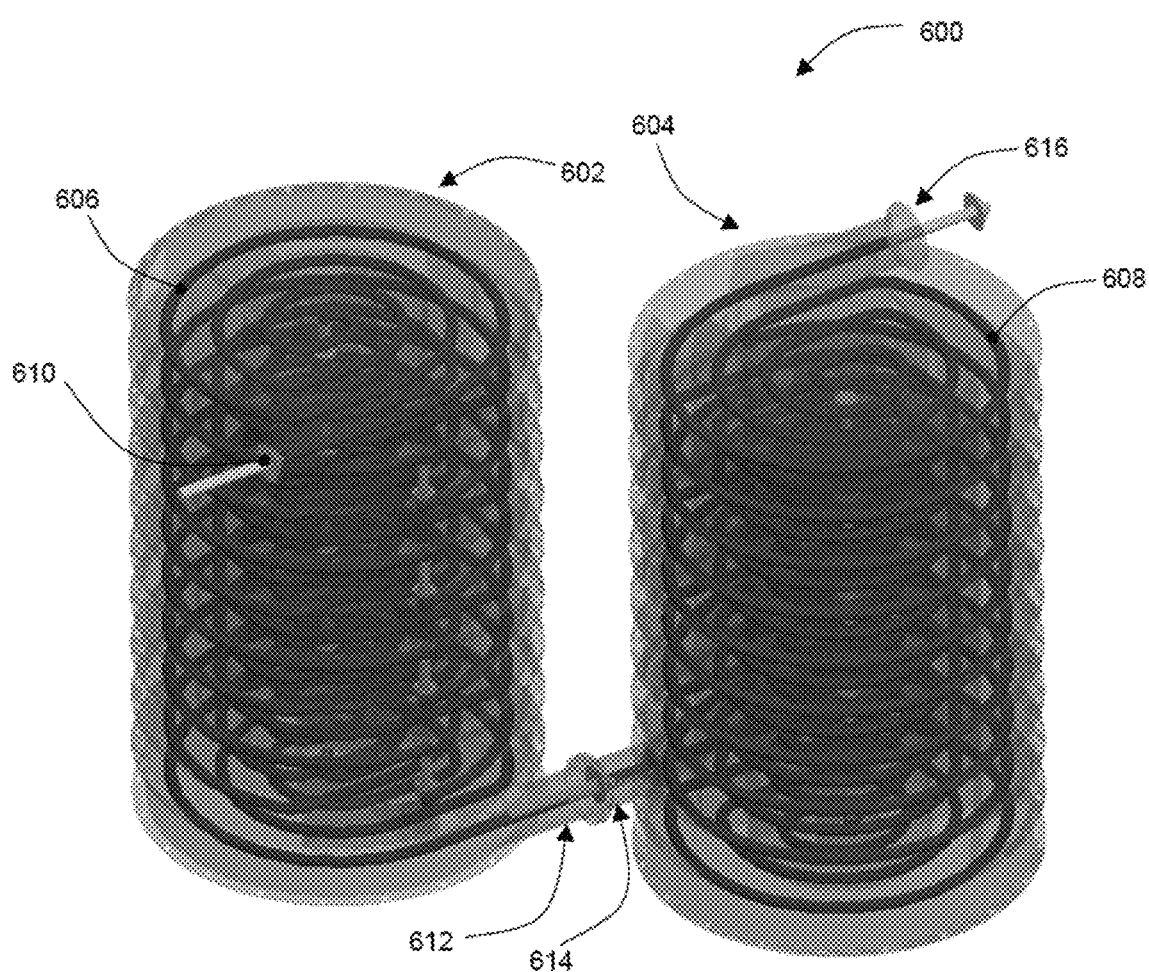
FIG. 16 depicts some embodiments of the disclosure where two hydration vessel apparatus are fluidly connected in series, in accordance with the disclosure.

FIG. 16 depicts some embodiments of the disclosure where two hydration vessel apparatus are fluidly connected in series. A plurality of hydration vessels may be used to further increase swept volume capacity of a hydration vessel system. Hydration vessel system 600 includes hydration vessels 602 and 604 shown in transparent shadowed form, and fluid flowpaths 606 and 608 are shown therein. Vessels 602 and 604 may include any of the features and function of the components described for the vessels and enclosures illustrated in FIGS. 1 through 15. For example, hydration vessels 602 and 604 may be similar or like vessel 300, with vessel 604 orientated in an inverted vertical orientation, or in other instances, orientated in the same manner with a suitable conduit connecting the vessels. A fluid mixture of water and hydratable polymer may be introduced into system 600 at inlet port 610, and move through vessel 602 by flowpath 606. The mixture, which may be at least partially hydrated, exits vessel 602 at discharge port 612, then enters vessel 604 at inlet 614. The mixture moves through vessel 604 by flowpath 608, and exits vessel 604 at discharge port 616, produced as a substantially hydrated slurry of hydratable material and water.

Figure 17:
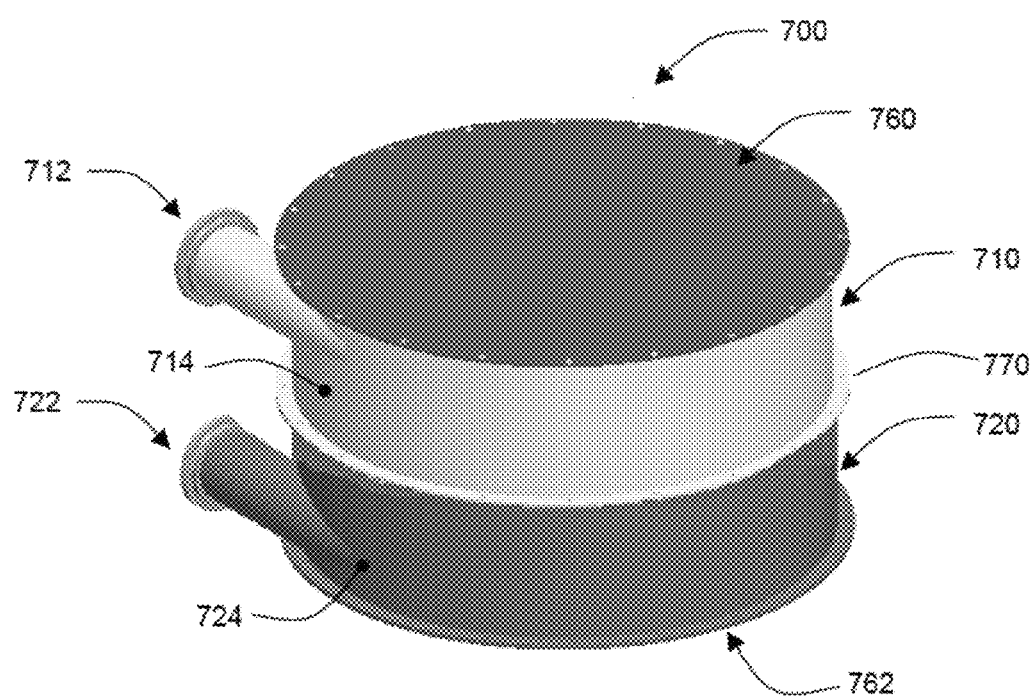
FIG. 17 illustrates some further apparatus embodiments, in accordance with the disclosure.
Figure 18:
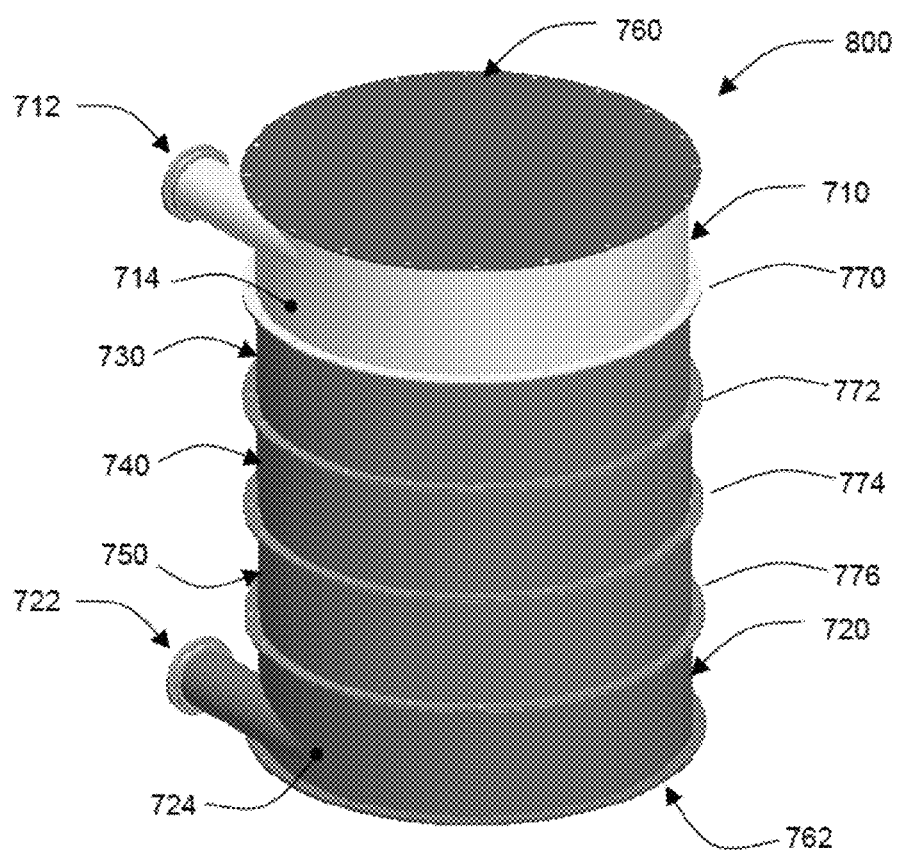
FIG. 18 depicts some further apparatus embodiments, in accordance with the disclosure.

Now referencing FIG. 17, which illustrates some further apparatus embodiments according to the disclosure, such as a hydration vessel useful for hydrating a mixture of water and a hydratable material, or even forming a product from an admixture of components and chemicals. Apparatus 700 includes a first chamber 710 and a second chamber 720. In some aspects of the disclosure, apparatus 700 may further include one or more intermediate chambers as shown in FIG. 18. Apparatus 700 may further include an inlet port 712 disposed on the perimeter 714 of first chamber 710. Port 712 may receive the mixture of water and a hydratable material, or any suitable mixture liquid and solid, for blending, or otherwise further mixing, to form a slurry. Port 722 is disposed on the perimeter 724 of the second chamber 720 of apparatus 700, and may produce, or otherwise discharge a slurry of liquid and polymer, such as water and hydratable material. Ports 712 and 722 may be flush or extend outward from perimeters 714 and 724, and in some instances, may extend outward in tangential direction relative perimeters 714 and 724. In some aspects, the chambers 710 and 720 are separate chambers, through which the mixture travels a distance over a time period for hydration. The chambers, or enclosures, are in fluid communication which allows the mixture to pass from port 712, through first chamber 710, then into any intermediate chamber(s), then into second chamber 720, and finally out of port 722.

Apparatus 700 may further include a first plate 760 disposed on an outer end of first chamber 710, a second plate 762 (not shown) disposed on an outer end of second chamber 720, and a partition plate 770 (not shown) disposed between first chamber 710 and second chamber 720, which may serve to help confine the mixture within the chambers 710 and 720. Plates 760, 762 and 770 may be affixed to the chambers by any suitable technique, including, but not limited to, removable fasteners attaching with a flange of the enclosure, welding, formed as an integrated portion of the chamber, and the like. Similarly, chambers 710, 720, as well as any intermediate chambers, may be affixed with one another by same or similar techniques. In FIG. 17, the chambers shown each include a flange extending from the top and bottom perimeters, for receiving fasteners, such as nuts and bolts, and securing the chambers (as well as plates where used) with one another.

Partition plate 770 further includes a port to establish fluid communication between inlet port 712 and discharge port 722. Within each of first chamber 710 and second chamber 720 are disposed a first and second continuous channels (or fluid passageways), with an intermediate partition plate separating the first and second continuous channels. The intermediate partition plate includes a port to maintain fluid communication between the first and second continuous channels, as well as fluid communication between inlet port 712 and discharge port 722.

Referring to FIG. 18, which depicts some further hydration vessel embodiments according to the disclosure. Similar to apparatus 700, hydration vessel 800 includes a first chamber 710 and a second chamber 720. Hydration vessel 800 further includes at least one intermediate chamber, and in the illustration three are shown, 730, 740 and 750. Hydration vessel may further include an inlet port 712 disposed on the perimeter 714 of first chamber 710, for receiving a mixture of water and a hydratable material. Port 722 is disposed on the perimeter 724 of the second chamber 720, and may produce, or otherwise discharge a slurry. As described above, ports 712 and 722 may be flush with or extend outward from perimeters 714 and 724, and in some instances, may extend outward in tangential direction relative perimeters 714 and 724. Chambers 710, 720, 730, 740 and 750 are in fluid communication which allows the mixture to pass from inlet port 712 and out of discharge port 722. Partition plates 770, 772, 774 and 776 are disposed between respective chambers 710 and 730, 730 and 740, 740 and 750, as well as 750 and 720. Partition plates 770, 772, 774 and 776 include a port to maintain fluid communication between inlet port 712 and discharge port 722. Similar with chamber 710 and second chamber 720, chambers 730, 740 and 750 each include first and second continuous channels, with an intermediate partition plate separating the first and second continuous channels. Each intermediate partition plate includes a port to maintain fluid communication between the first and second continuous channels, as well as fluid communication between inlet port 712 and discharge port 722. Hydration vessel also includes first plate 760 disposed upon an outer end of first chamber 710, and second plate 762 (not shown) disposed on an outer end of second chamber 720.

Figure 19:
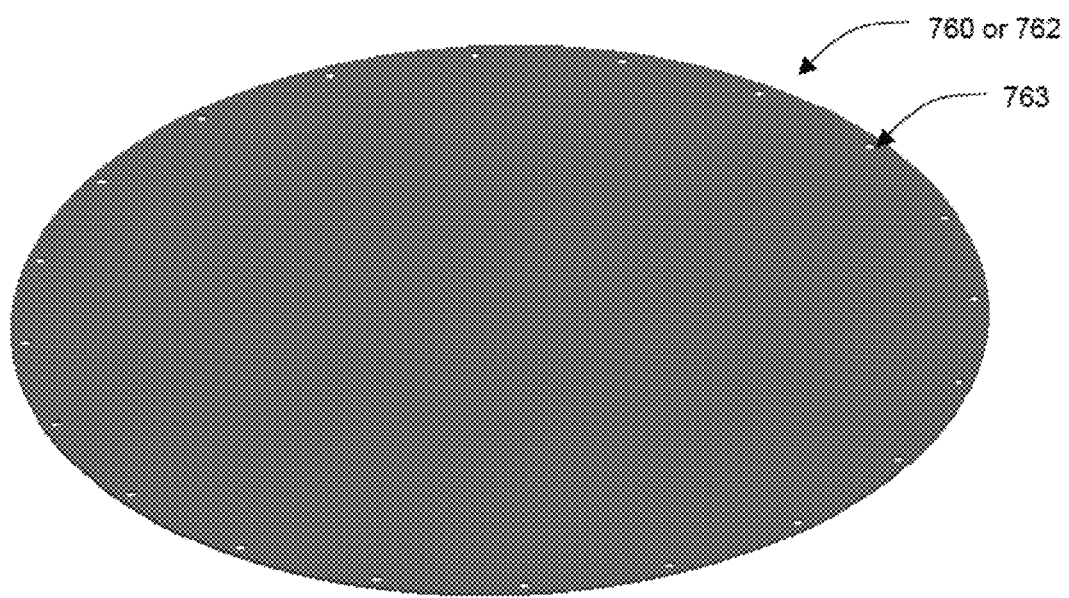
FIG. 19 illustrates a plate useful for affixing to outer ends of chambers or enclosures, in accordance with the disclosure.
Figure 20:
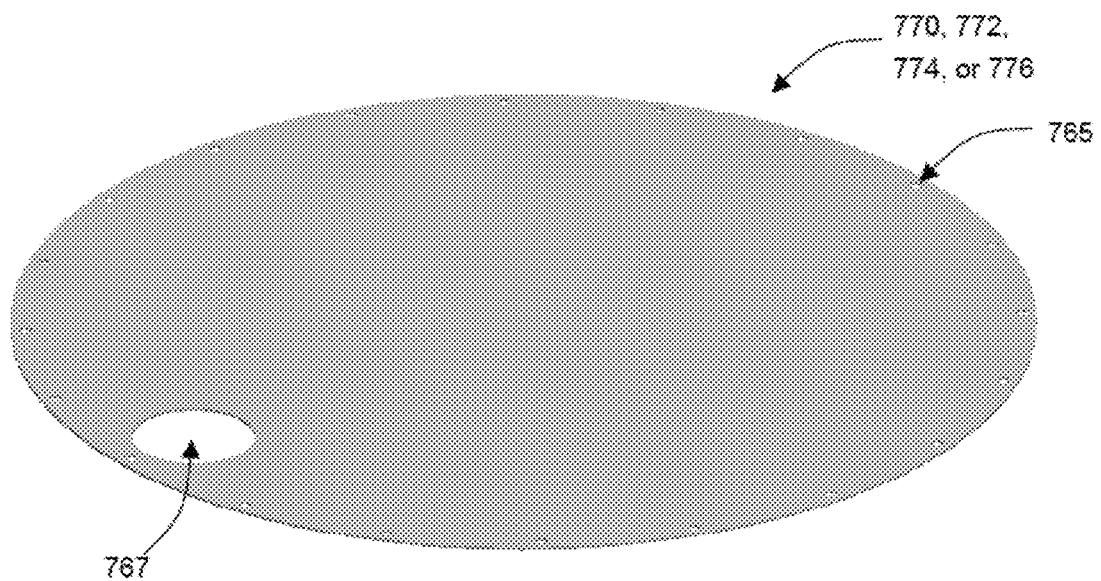
FIG. 20 shows a partition plate useful for affixing to chambers or enclosures, in accordance with the disclosure.

FIG. 19 illustrates a plate, which may be 760 or 762, useful for affixing to outer ends of chambers 710 and 720. Plate 760 and 762 may include holes 763 (twenty shown) disposed about the perimeter, in a flange bolt-hole pattern. FIG. 20 depicts a partition plate, which may be 770, 772, 774 or 776, useful for helping maintain fluid communication within hydration vessels 700 and 800, and affixed between chambers. The partition plate shown also includes holes 765 (twenty shown) disposed about the perimeter, in a flange bolt-hole pattern. Partition plates 770, 772, 774 and 776 further include port 767 proximate the outer perimeter of each plate.

Figure 21:
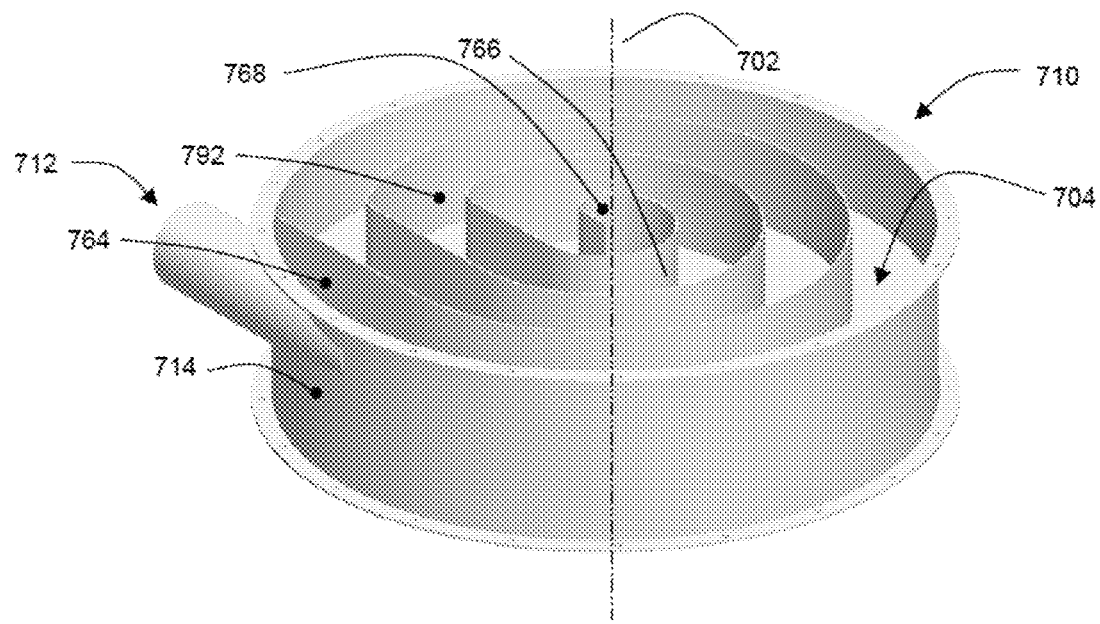
FIGS. 21 and 22 depict an outer chamber or enclosure in a top plan view and an opposing bottom plan view, in accordance with the disclosure.
Figure 22:
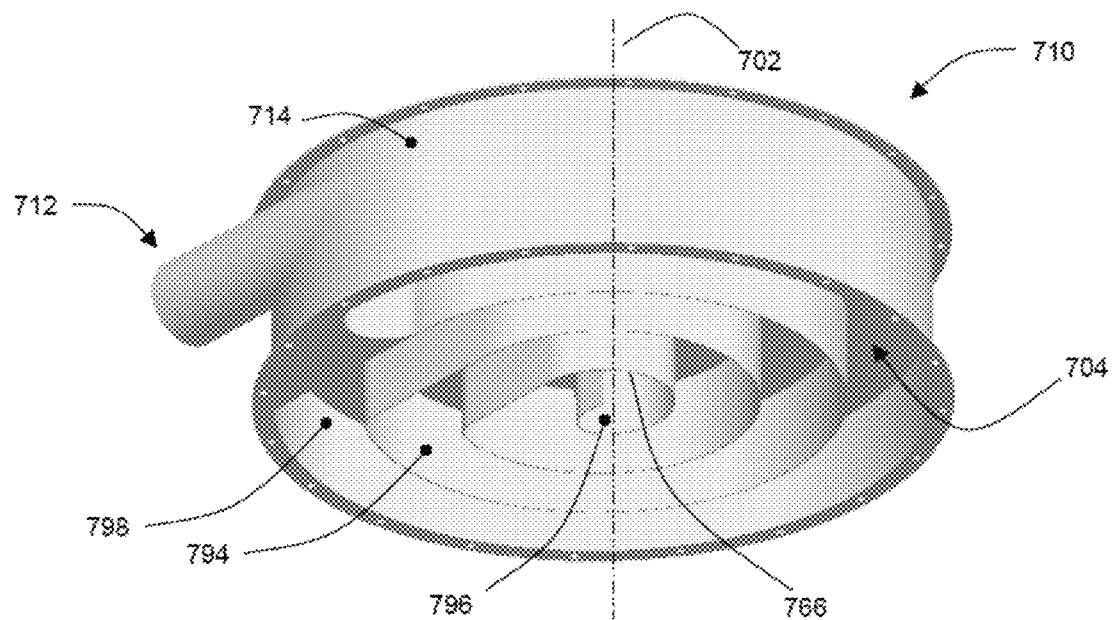

Now turning to FIGS. 21 and 22, which illustrate first outer chamber 710 depicted in FIGS. 17 and 18. FIG. 21 shows a top plan view, while FIG. 22 shows an opposing bottom plan view. First port 712, which may be an inlet port, disposed on perimeter 714 is in fluid communication with the first end 764 of a continuous channel, or fluid passageway, 792. Continuous channel 792 is disposed within first chamber 710 in a substantially spiral pattern, and includes second end 768 positioned at or near axial centerline 702. Continuous channel 792 is positioned upon intermediate partition plate 704. Intermediate partition plate 704 is disposed within chamber 710, in a plane substantially perpendicular to axial centerline 702, and further includes a port 766 (not shown) positioned at or near second end 768. As illustrated in FIG. 22, a continuous channel 794 is disposed on an opposed surface of intermediate partition plate 704. Continuous channel 794 includes first end 796 disposed at or near axial centerline 702, and second end 798 positioned proximate perimeter 714. Continuous channel 794 has a substantially spiral pattern as well. Continuous channel 792 and continuous channel 794 are in fluid communication by port 766. A mixture water and hydratable material may enter chamber 710 through port 712, pass through continuous channel 792 in an inwardly spiraling manner, transfer to continuous channel 794 through port 766, travel through continuous channel 794 in an outwardly spiraling pattern, and exit chamber 710 at end 798. In those cases where a partition plate with a port is disposed over continuous channel 794, such as partition plate 770 with a port 767 (as shown in FIGS. 17, 18 and 20), the mixture may exit chamber 710 through port 767 positioned at end 798, and then enter another chamber.

Figure 23:
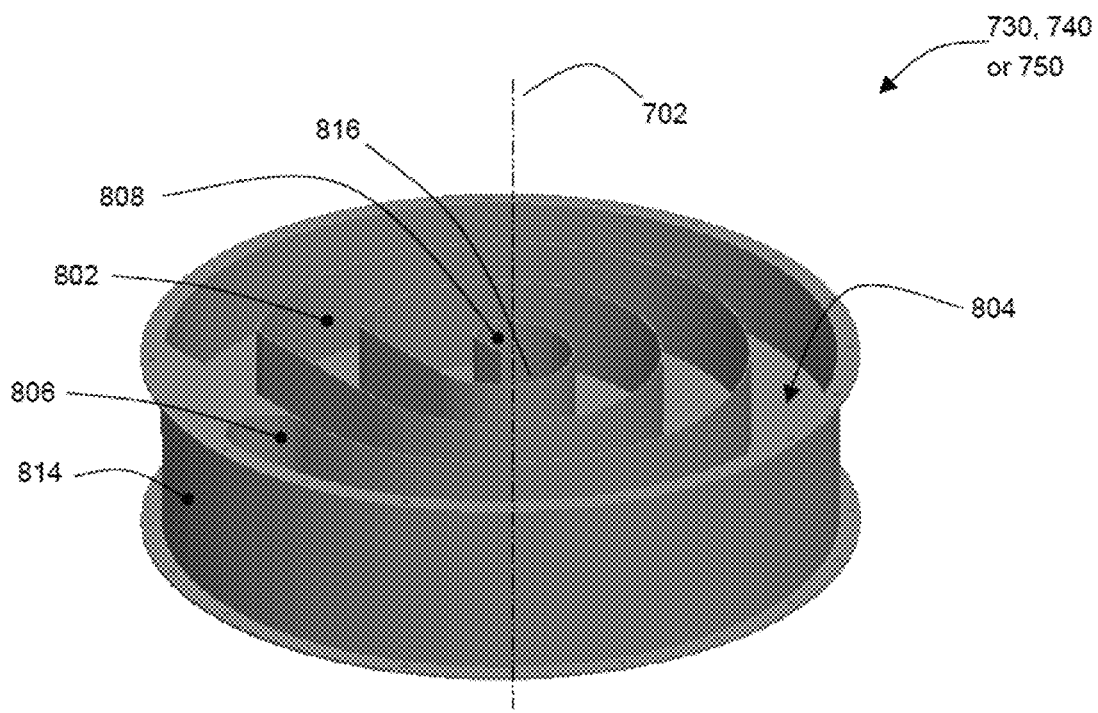
FIGS. 23 and 24 illustrate an intermediate chamber or enclosure in a top plan view and an opposing bottom plan view, in accordance with the disclosure.
Figure 24:
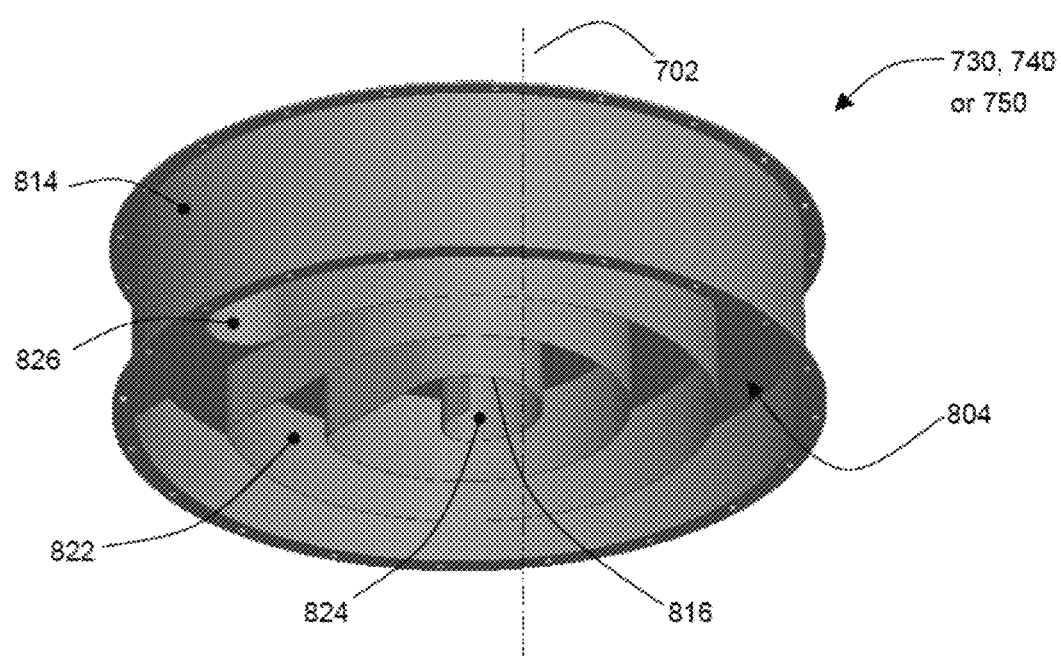

FIGS. 23 and 24 depict an intermediate chamber useful in some embodiments of the disclosure, and which describes intermediate chambers 730, 740 and 750 shown in FIG. 18. FIG. 23 shows a top plan view, while FIG. 24 shows an opposing bottom plan view. The intermediate chamber includes a continuous channel, or fluid passageway, 802 disposed upon an intermediate partition plate 804. Continuous channel 802 includes a first end 806 positioned proximate perimeter 814 of the intermediate chamber. Continuous channel 802 further includes a second end 808 positioned at or near axial centerline 702, and intermediate partition plate 804 includes a port 816 (not shown) positioned at or near second end 808. Continuous channel 802 is disposed within the intermediate chamber in a substantially spiral pattern. As illustrated in FIG. 24, a continuous channel 822 is disposed on an opposed surface of intermediate partition plate 804. Continuous channel 822 includes first end 824 disposed at or near axial centerline 702, and second end 826 positioned proximate perimeter 814. Continuous channel 822 has a substantially spiral pattern as well. Continuous channel 802 and continuous channel 822 are in fluid communication by port 816. A mixture, such as water and hydratable material, may enter chamber 730, 740 or 750 at end 806 from a port, such as port 767 of partition plate 770, pass through continuous channel 802 in an inwardly spiraling manner, transfer to continuous channel 822 through port 816, travel through continuous channel 822 in an outwardly spiraling pattern, and exit chamber 730, 740 or 750 at end 826. In instances where another partition plate with a port is disposed over continuous channel 822, such as partition plate 770 with a port 767 (as shown in FIGS. 17, 18 and 20), the mixture may exit chamber 730, 740 or 750 through port 767 positioned at end 826, and then enter another chamber. While FIG. 18 shows a hydration vessel including three intermediate chambers 730, 740 and 750, and FIG. 17 depicts a vessel with no intermediate chamber, these example are not limiting, and it is within the spirit and scope of the disclosure to include any suitable number of intermediate chambers.

Figure 25:
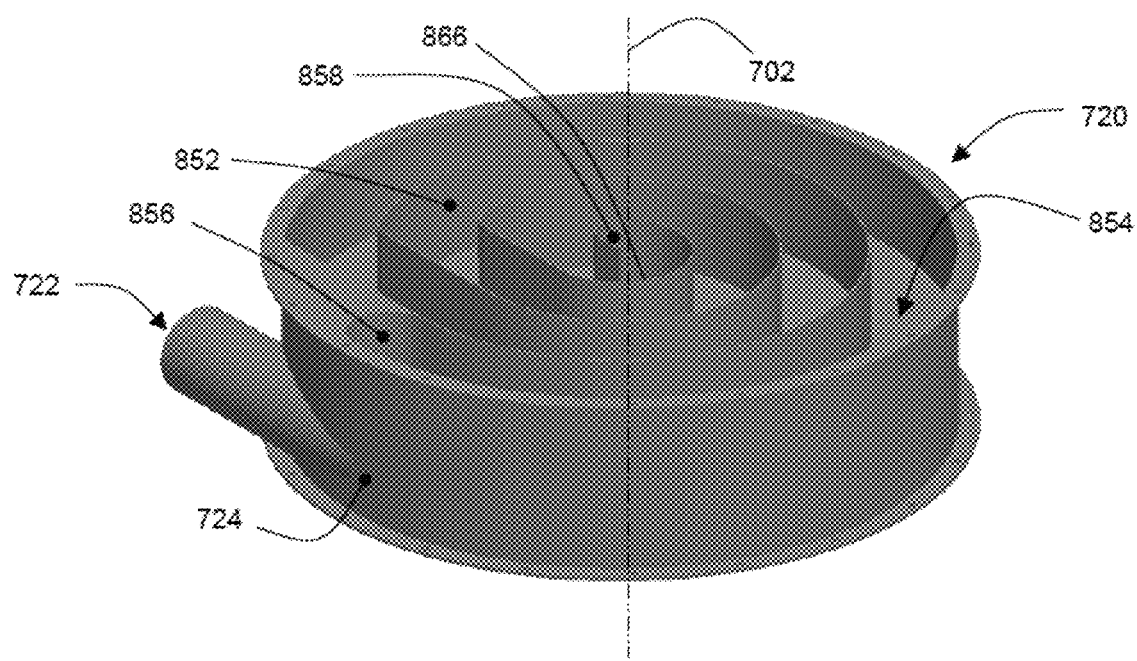
FIGS. 25 and 26 show another outer chamber or enclosure in a top plan view and an opposing bottom plan view, in accordance with the disclosure.
Figure 26:
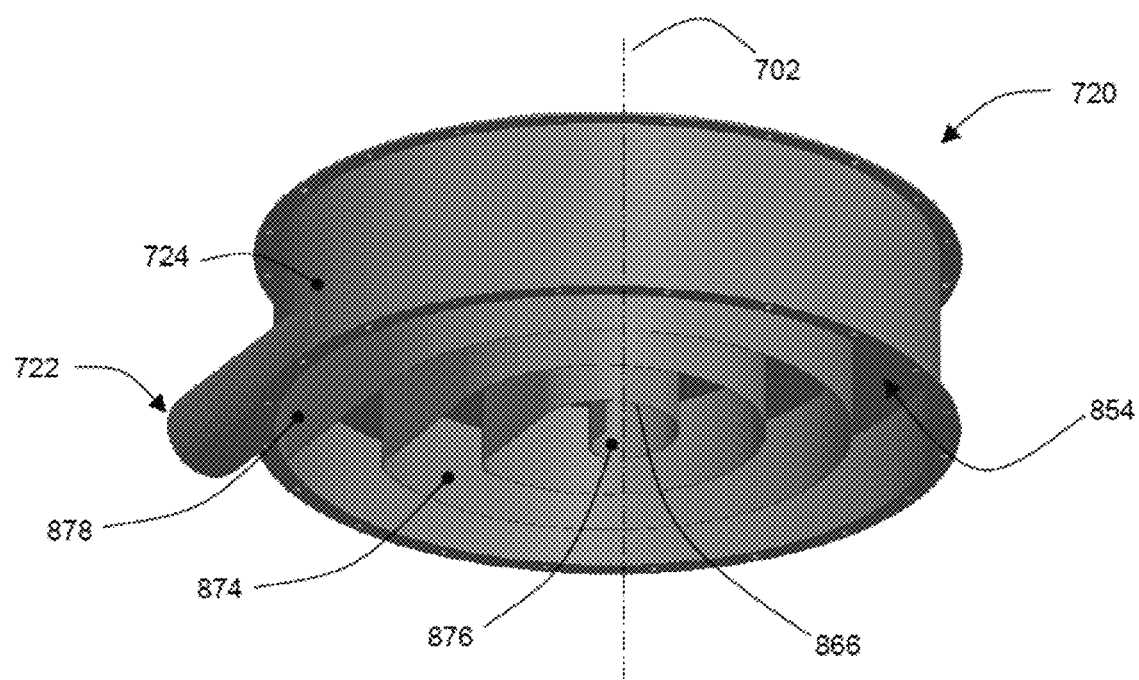

Referencing FIGS. 25 and 26, which show second outer chamber 720 depicted in FIGS. 17 and 18. FIG. 25 depicts a top plan view, while FIG. 26 shows an opposing bottom plan view. Continuous channel, or fluid passageway, 852 is disposed within second chamber 720 in a substantially spiral pattern, and positioned upon an intermediate partition plate 854. Continuous channel 852 includes a first end 856 positioned proximate perimeter 724 of chamber 720, and a second end 858 positioned at or near axial centerline 702. Intermediate partition plate 854 includes a port 866 (not shown) positioned at or near second end 858. Now turning to FIG. 26, a continuous channel 874 is disposed on an opposed surface of intermediate partition plate 854. Continuous channel 874 includes a first end 876 disposed at or near axial centerline 702, and second end 878 positioned proximate perimeter 714. Disposed on the perimeter of chamber 720 and at the second end 878 is discharge port 722. Continuous channel 874 has a substantially spiral pattern as well. Continuous channel 852 and continuous channel 874 are in fluid communication through port 866. A mixture of water and hydratable material may enter chamber 720 at first end 856 from a port disposed above, pass through continuous channel 852 in an inwardly spiraling flowpath, transfer to continuous channel 874 through port 866, travel through continuous channel 874 in an outwardly spiraling manner to second end 878, and exit chamber 720 at discharge port 722.

Figure 27:
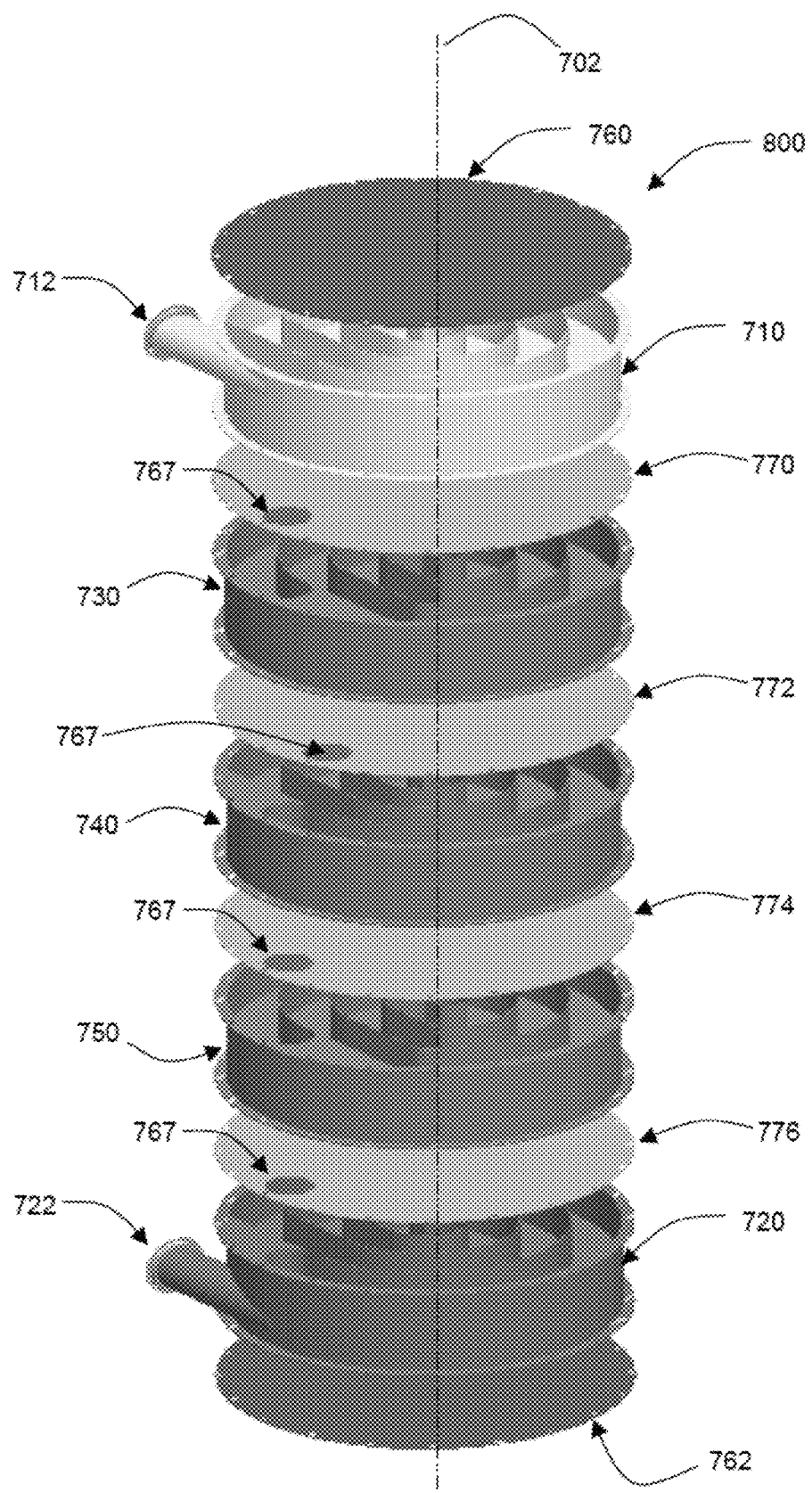
FIG. 27 illustrates, in an exploded view, a system of chambers or enclosures configured and constructed as depicted in FIGS. 18 through 26, in accordance with the disclosure.

FIG. 27 illustrates, in an exploded view, the system of enclosures, or chambers, which are configured and constructed as depicted in FIGS. 18 through 26, and described herein above. Hydration vessel, 800 includes chambers 710, 720, 730, 740 and 750, each with a pair of alternating spiraling continuous channels disposed therein. The center of chambers 710, 720, 730, 740 and 750 are positioned upon axial centerline 702. Each chamber includes intermediate partition plates within as well, the intermediate partition plates each including a port disposed at or near axial centerline 702. Partition plates 770, 772, 774 and 776 are positioned between the respective chambers, and further include ports 767 proximate the outer perimeter of each plate. Plate 760 is disposed upon an outer end of first chamber 710, and plate 762 disposed on an outer end of second chamber 720. A liquid/polymer mixture may be introduced into inlet port 712, passing through the plurality of chambers through the series of substantially spiraling continuous channels and ports, then exit at discharge port 722 in the form of an at least partially hydrated slurry.

While chambers 710, 720, 730, 740 and 750 are depicted circular perimeter shapes, other perimeter shapes such as rectangular, triangular, ovate, square, and the like, are within the scope of the disclosure. Further, while the flow pattern of the continuous channels are described as substantially spiral in FIGS. 17 through 26, the continuous channels, or fluid passageways, are essentially of length greater than the length of the perimeter of its respective chamber. The number of rotations of a spiral pattern is not necessarily limiting for embodiments of the disclosure, as long as the continuous channels, are essentially of length greater than perimeter length.

In yet another aspect of the disclosure, vessels may have a single enclosure, such as 710 depicted in FIGS. 21 and 22, with port 712 in fluid communication with the first end 764 of channel 792. Channel 792 is disposed within first chamber 710 and includes second end 768, and partition plate 704 disposed within chamber 710, and further includes a port 766 positioned at or near second end 768. FIG. 22 shows channel 794 disposed on an opposed surface of intermediate partition plate 704, and channel 794 includes first end 796 disposed at or near axial centerline 702, and second end 798 positioned proximate perimeter 714. Disposed on the perimeter of chamber 710 and at the second end 798 may be a discharge port, such as 722 shown in FIGS. 25 and 26. While enclosure 710 is shown in FIGS. 21 and 22 as open, covers such as 760 shown in FIG. 19, may be disposed over the openings to seal the enclosure.

Figure 28:
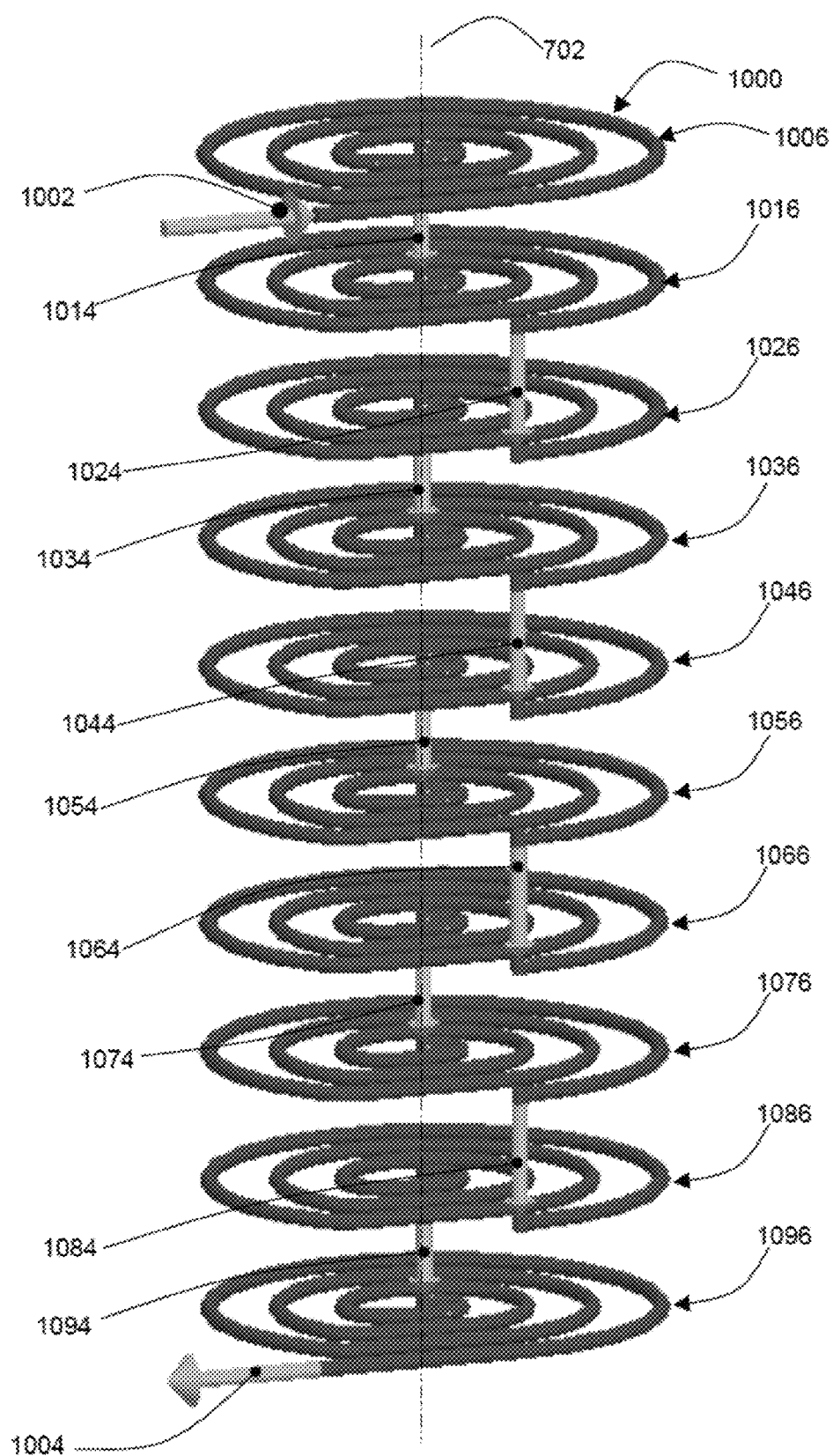
FIGS. 28 and 29 illustrate alternating inward/outward substantially spiral mixture flow pattern through a hydration vessel, without showing the vessel in FIG. 28, and showing vessel in a transparent shadowed form in FIG. 29, in accordance with the disclosure.
Figure 29:
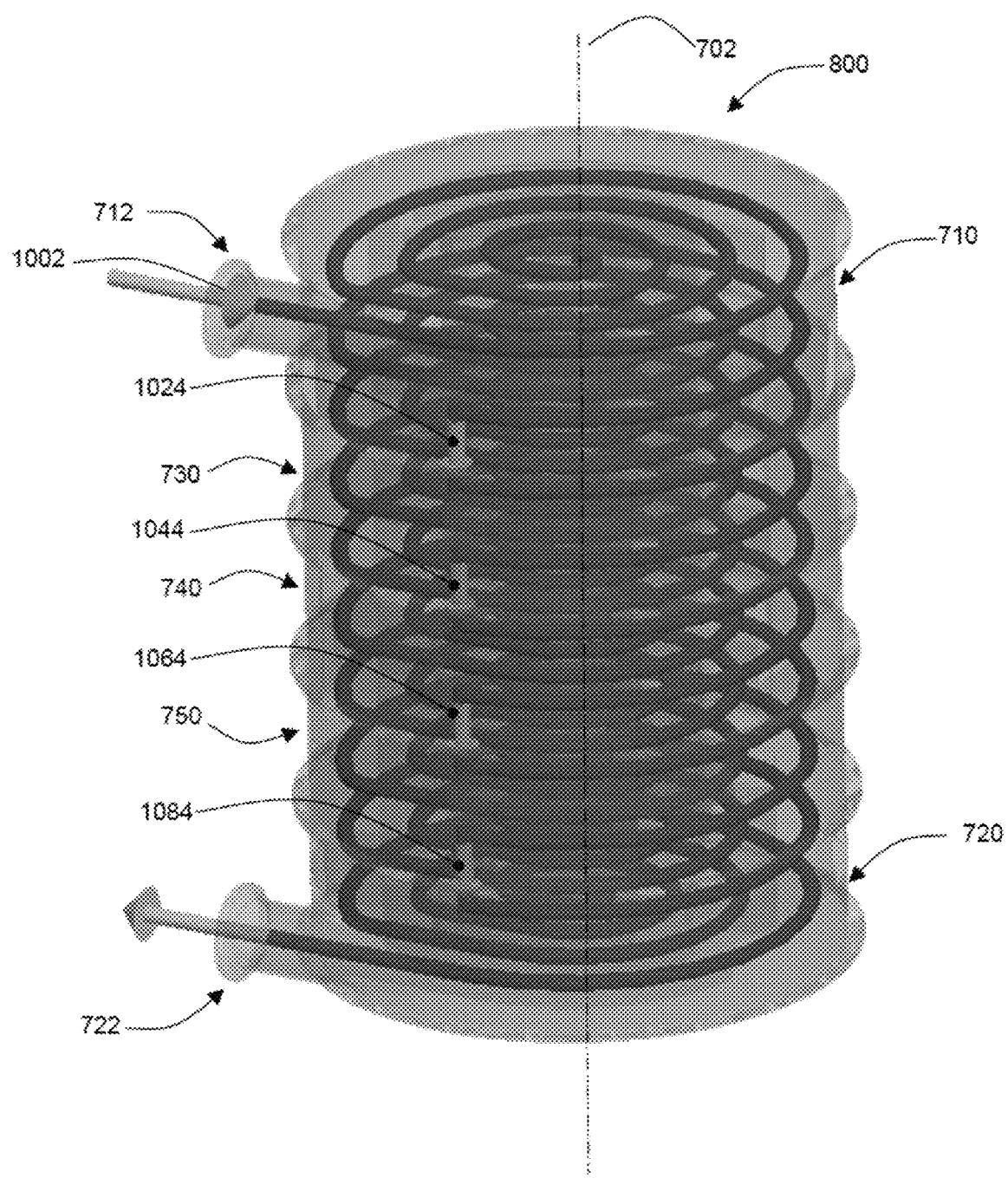

FIGS. 28 and 29 illustrate alternating inward/outward substantially spiral mixture flow pattern 1000 through hydration vessel 800, without showing vessel 800 in FIG. 28, and showing vessel 800 in a transparent shadowed form in FIG. 29. Flow pattern 1000 is illustrated to provide a general depiction of material flow through hydration vessel like or similar to the vessel 800, and may be applicable to any variations in vessel design utilizing chambers with intermediate partition plates and partition plates, such as those described above. The mixture is introduced into the inlet port 712 of outer chamber (or enclosure) 710 at point 1002, then travels through a first continuous channel in an inwardly spiral direction 1006 before transferring, at or near axial centerline 702, to a second continuous channel of chamber 710 at point 1014. The mixture then moves outwardly spiraling 1016 before transferring to the next chamber 730 at point 1024. The mixture then travels through a first continuous channel of chamber 730 in an inwardly spiral direction 1026 before transferring to a second continuous channel of chamber 730 at point 1034, and then moves through the second continuous channel of chamber 730 in an outwardly spiraling pattern 1036 to then transfer to the next chamber 740 at point 1044. The mixture then enters a first continuous channel of chamber 740 and travels in an inwardly spiraling fashion 1046 to point 1054, and transfers to a second continuous channel of chamber 740. In the second continuous channel of chamber 740, the mixture moves in an outwardly spiraling pattern 1056 to point 1064, and moves to chamber 750. Upon entering chamber 750, the mixture moves in an inwardly spiral direction 1066 through a first continuous channel, then transfers at point 1074 into a second continuous channel and travels in an outwardly spiral direction 1076 to point 1084. The mixture then transfers to a first continuous channel in outer chamber 720 and moves in an inwardly spiraling direction 1086 through a first continuous channel, to point 1094. At point 1094, the mixture transfers to a second continuous channel in outer chamber 720, travels in an outwardly spiraling pattern 1096, and then discharges from outer chamber 720 at point 1004.

Figure 30:
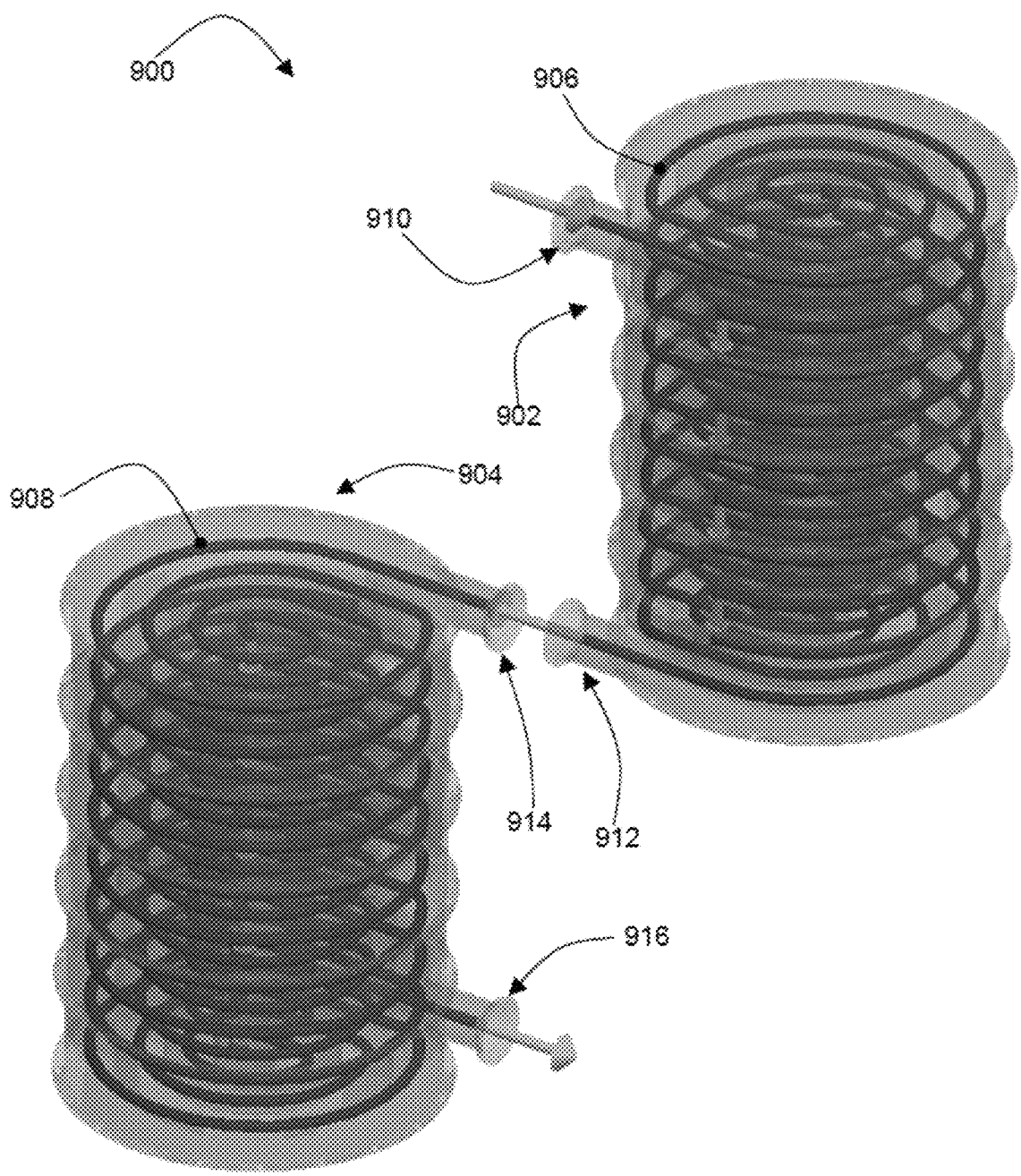
FIG. 30 depicts some embodiments of the disclosure where two hydration vessel apparatus are fluidly connected in series, in accordance with the disclosure.

FIG. 30 depicts some embodiments of the disclosure where two hydration vessel apparatus, such as vessels 800, are fluidly connected in series. The plurality of hydration vessels may be used to further increase swept volume capacity of a hydration vessel system. Hydration vessel system 900 includes hydration vessels 902 and 904 shown in transparent shadowed form, and fluid flowpaths 906 and 908 are shown therein. Vessels 902 and 904 may include any of the features and function of the components described for the vessels and enclosures illustrated in FIGS. 17 through 29. For example, hydration vessels 902 and 904 may be similar or like vessel 800, with vessel 904 orientated in a like vertical orientation as vessel 902 with a suitable conduit connecting the vessels, or in other instances, orientated in an inverted manner. A fluid mixture of water and hydratable material may be introduced into system 900 at inlet port 910, and move through vessel 902 by flowpath 906. The mixture, which may be at least partially hydrated in some cases, exits vessel 902 at discharge port 912, then enters vessel 904 at inlet 914. The mixture moves through vessel 904 by flowpath 908, and exits vessel 904 at discharge port 916, produced as a substantially hydrated slurry of hydratable material and water.

Figure 31:
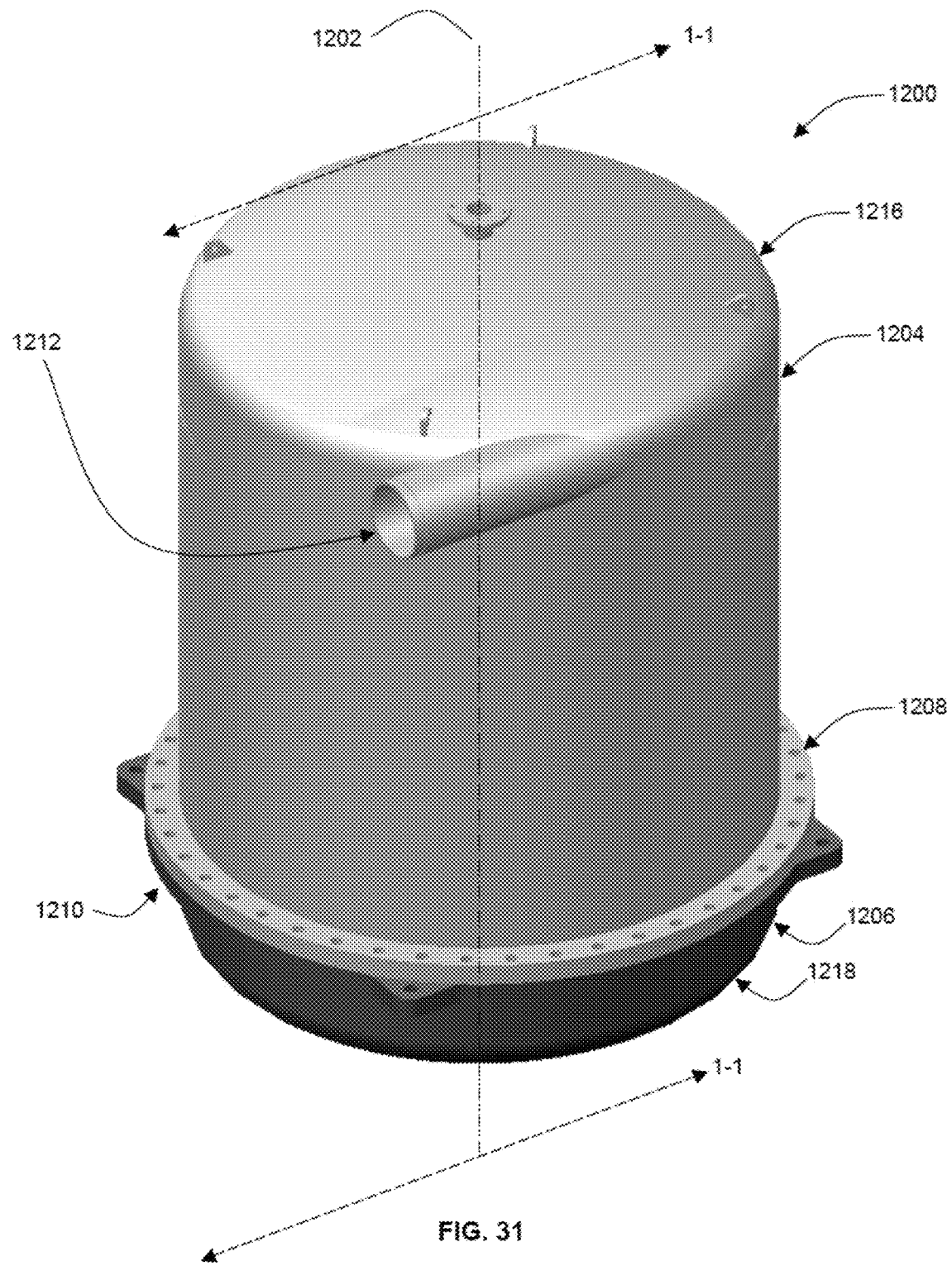
FIG. 31 illustrates another hydration vessel, or apparatus, in accordance with the disclosure.

Referring now to FIG. 31, which illustrates another hydration vessel, or apparatus, according to the disclosure. The hydration vessel 1200 includes first enclosure 1204 having an interior space defined therein, and second enclosure 1206 having an interior space defined therein, where enclosures 1204 and 1206 may be affixed with one another at flanges 1208 and 1210. In some aspects of the disclosure, the interior space defined within an outer portion 1216 of first enclosure 1204 may be considered an inlet chamber, while the interior space defined within an outer portion 1218 of second enclosure 1206 may be considered a discharge chamber. First enclosure 1204 further includes an inlet port 1212 disposed on the surface, which may be useful for receiving a mixture of hydratable material and water. A discharge port 1214 (shown in FIG. 32) is disposed on a surface of the second enclosure 1206, and may be utilized to produce a slurry of water and at least partially hydrated material.

Figure 32:
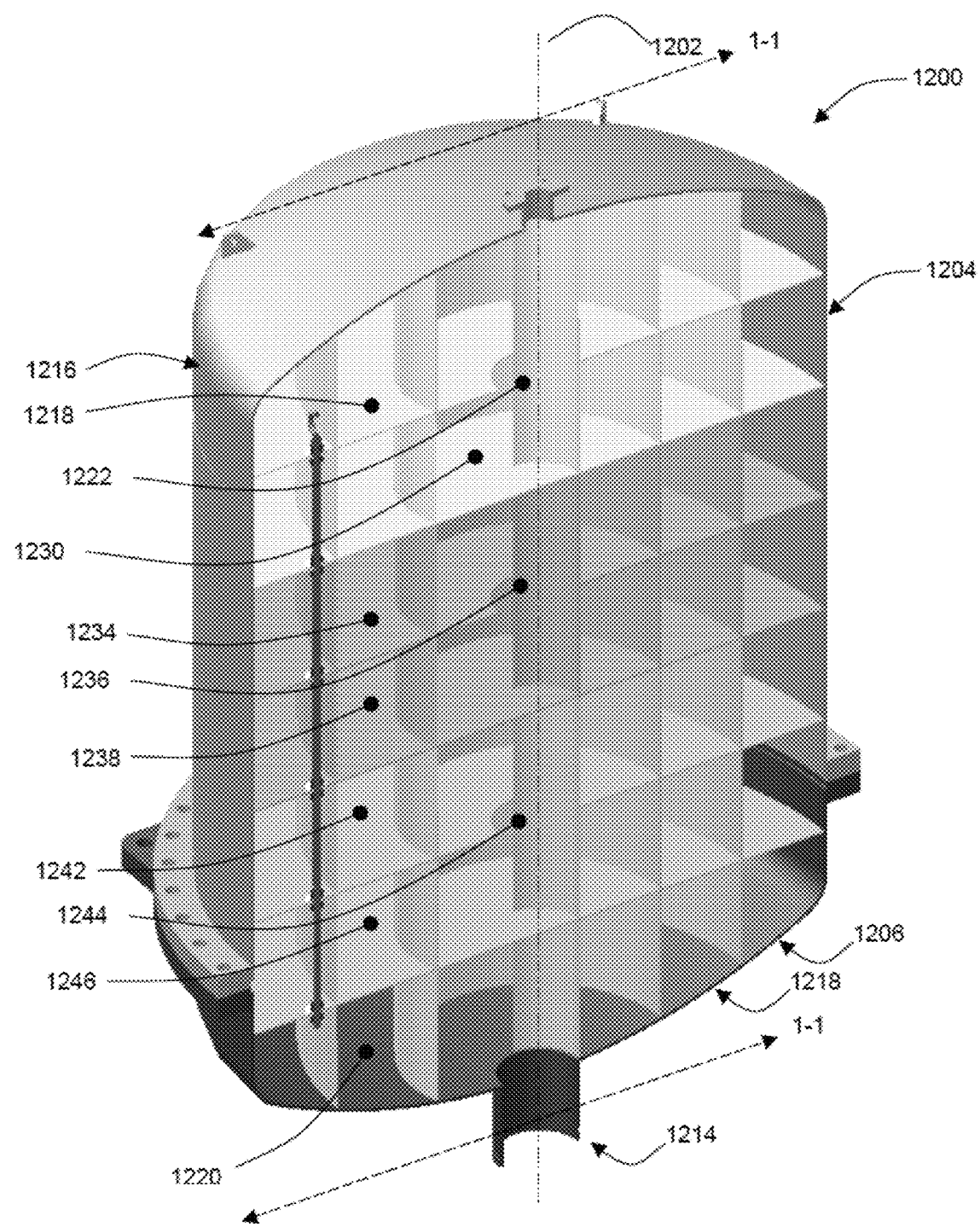
FIG. 32 shows the hydration vessel depicted in FIG. 31, in a cross-section format, in accordance with the disclosure.

FIG. 32 shows the hydration vessel 1200 in a cross-section format, where the cross-section is made at plane 1-1 parallel to and lying upon axial centerline 1202 of vessel 1200 depicted in FIG. 31. The interior space defined within outer portion 1216 of first enclosure 1204 includes a first continuous channel, or first fluid passageway, 1218 having a channel-length greater than a length of the outer perimeter of the first enclosure 1204. In the embodiment illustrated, a mixture may be introduced through inlet port 1212 (shown in FIG. 31) and travel in a progressively inward pattern through first continuous channel 1218 to port 1222 disposed at, or proximate axial centerline 1202. In some alternative embodiments, the mixture may be introduced through an inlet port disposed in other suitable locations on the surface of first enclosure 1204 and travel through first continuous channel, or first fluid passageway, 1218 in a progressively outward pattern. Referring again to the embodiment depicted in FIG. 32, the mixture may pass through a series of additional continuous channels, or fluid passageways, within the hydration vessel 1200, as described in further detail below, and then enter into second continuous channel, or second fluid passageway, 1220, through port 1224 (shown in FIG. 33). Port 1224 may be disposed at, or proximate, the perimeter of outer portion 1218 of second enclosure 1206. The mixture may then travel in a progressively inward pattern through second continuous channel 1220 and discharge as a partially or substantially fully hydrated slurry of water and hydratable material through discharge port 1214. While discharge port 1214 is depicted as disposed at, or proximate to, the axial centerline 1202 of outer portion 1218 of second enclosure 1206, in some alternative embodiments, the mixture may travel through second continuous channel 1218 in a progressively outward pattern, and discharge through a port disposed at any suitable location on second enclosure 1206. Inlet port 1212 and discharge port 1214 of hydration vessel 1200 are in fluid communication.

Figure 33:
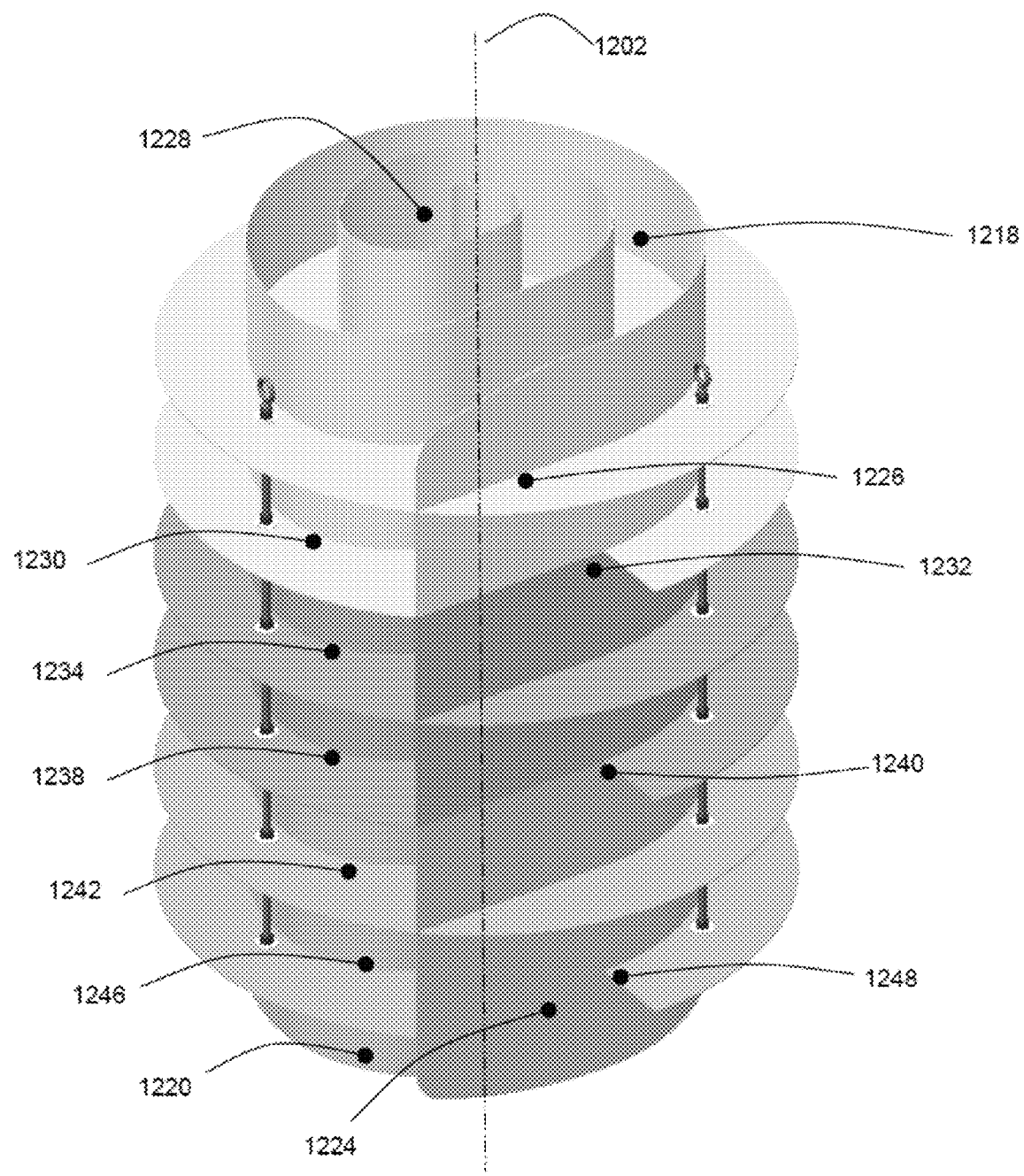
FIG. 33 illustrates, in an interior view, the series of continuous channels, or first fluid passageways, within the interior of hydration vessel, in accordance with the disclosure.

Now referencing FIG. 33 which illustrates in an interior view, the series of continuous channels, or first fluid passageways, within the interior of hydration vessel 1200, as well as referencing FIG. 32. The series of continuous channels, or first fluid passageways, are in fluid communication with one another, as well as inlet port 1212 and discharge port 1214, of hydration vessel 1200. The mixture described above, is introduced into first continuous channel 1218 at point 1226, and travels in a progressively inward pattern, substantially parallel to the perimeter of enclosure, or chamber, 1204, to point 1228. At point 1228, the mixture exits continuous channel 1218 at port 1222 (shown in FIG. 32), and enters third continuous channel, or fluid passageway 1230. The mixture may then travel in a progressively outward pattern, and substantially parallel to the above described perimeter, to point 1232. At point 1232, a fourth port is disposed at or proximate an end of third continuous channel, or fluid passageway, 1230 where the mixture then enters fourth continuous channel, or fluid passageway 1234. The mixture travels in a progressively inward pattern to port 1236, and enters fifth continuous channel, or fluid passageway 1238. Travelling in a progressively outward pattern, the mixture reaches point 1240, and transfers to a sixth continuous channel, or fluid passageway, 1242, through a port. The mixture then travels in a progressively inward pattern, and exits channel 1242 at port 1244. After entering seventh continuous channel, or fluid passageway, 1246, the mixture continues in a progressively outward pattern through channel 1246 to point 1248. At point 1248, the mixture transfers to second continuous channel, or fluid passageway, 1220, through port 1224, then travels in a progressively inward pattern, substantially parallel with the perimeter, and is discharged through port 1214.

Figure 34:
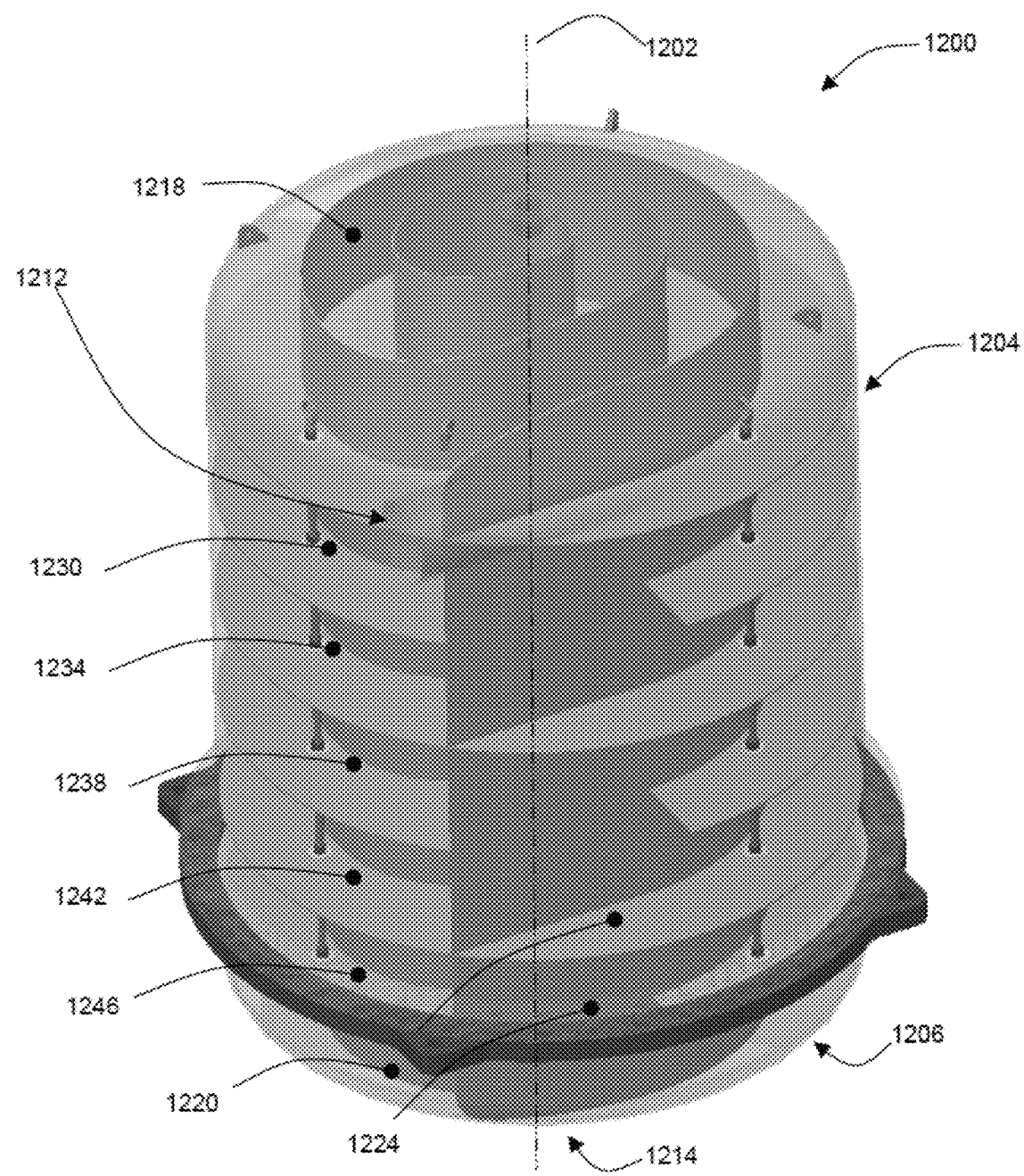
FIG. 34 depicts an apparatus with enclosures shown in shadowed form, according to some aspects of the disclosure, to further illustrate how the hydration concept of this disclosure would function in the embodiment described.

FIG. 34 depicts apparatus 1200, with enclosures shown in shadowed form, according to some aspects of the disclosure, to further illustrate how the hydration concept of this disclosure would function in the embodiment described. Mixtures described above would enter hydration vessel 1200 though inlet port 1212, spiral through first channel 1218, transfer to and spiral through third channel 1230, transfer to and spiral through fourth channel 1234, transfer to and spiral through fifth channel 1238, transfer to and spiral through sixth channel 1242, transfer to and spiral through sixth channel 1246, transfer to and spiral through second channel 1220, and discharge from port 1214 (shown in FIG. 32). While FIGS. 31 through 34 illustrate one apparatus, or hydration vessel, 1200, a plurality of such apparatus be may connected in series, parallel, or combination of series and parallel, is within the scope and spirit of the disclosure.

Figure 35:
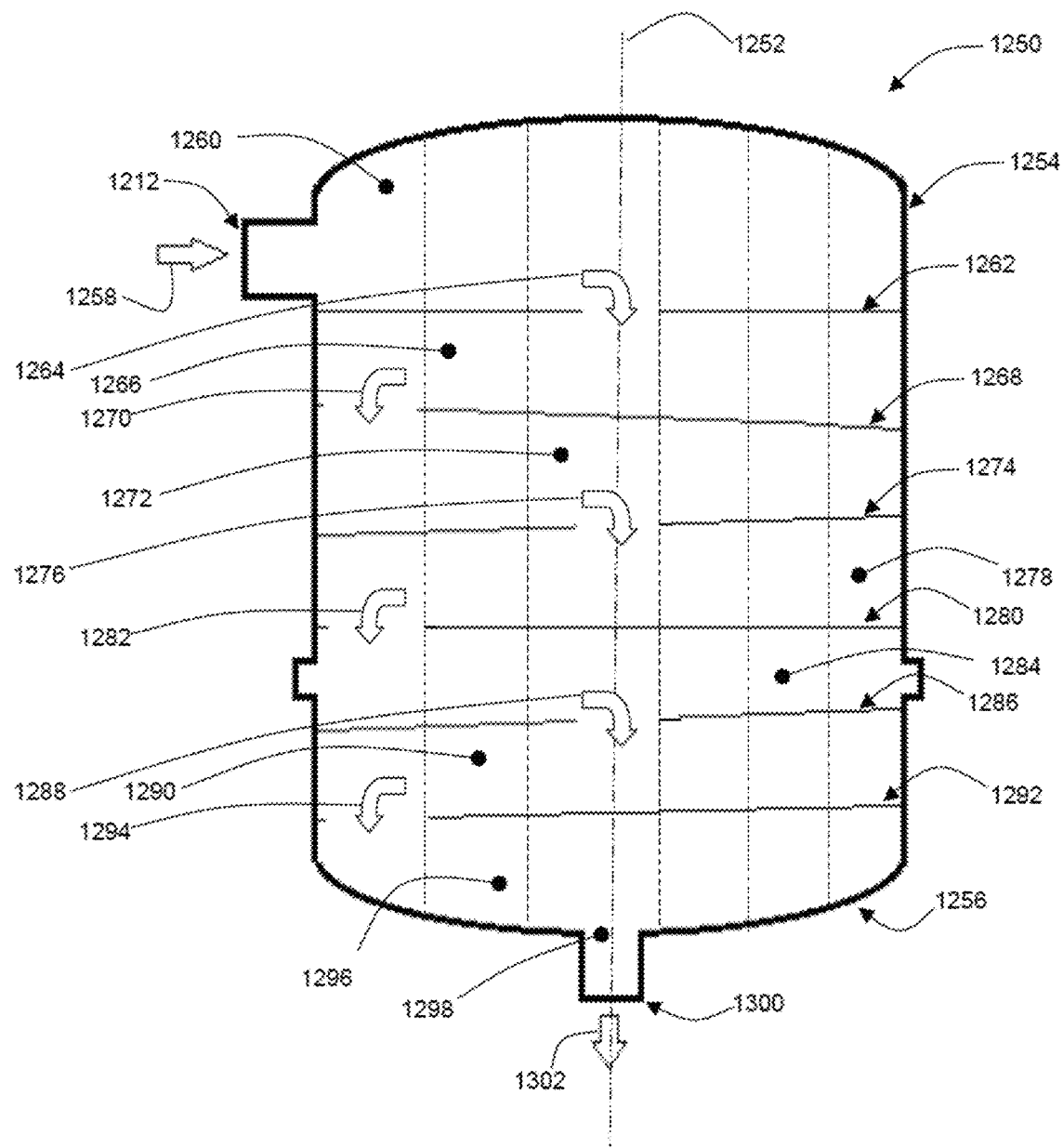
FIG. 35 illustrates, in cross-section view, a hydration vessel with nonparallel partitions, or plates, between channels or fluid passageways in nonparallel orientations, in accordance with the disclosure.

FIG. 35 illustrates another aspect of the disclosure, in cross-section view, which is a hydration vessel with non-parallel partitions, or plates, between continuous channels or fluid passageways, in nonparallel orientations. The cross-section is made on plane parallel to and lying upon axial centerline 1252, otherwise the vessel is substantially cylindrical in an overall three dimensional shape. Hydration vessel 1250 includes a first enclosure 1254 and second enclosure 1256. A mixture may be introduced into hydration vessel 1250 at point 1258 and move in an inwardly spirally pattern through fluid passageway 1260, which is disposed upon partition plate 1262. As shown, partition plate 1262 lies in a plane substantially perpendicular to axial centerline 1252. The vertical dashed lines shown in the illustration represent the wall structures which form the vertical limits of the fluid passageways, the passageways are fluidly continuous from the inner perimeter to the center of the hydration vessel, and the passageways are substantially spiral in shape. Hence, the fluid passageways have a length greater than the perimeter of the hydration vessel.

At point 1264, the mixture transfers through a port to fluid passageway 1266, which is disposed between partition plates 1262 and 1268. As shown, partition plate 1268 is not orientated parallel with plate 1262. The mixture passes in an outwardly spiral pattern through fluid passageway 1266 to point 1270, and transfers through a port to fluid passageway 1272. Fluid passageway 1272 is disposed between partition plates 1268 and 1274, and the plates are not orientated in parallel planes. The mixture then moves in an inwardly spiral through fluid passageway 1272 to point 1276, and passes through a port, near or at axial centerline 1252, to fluid passageway 1278. Fluid passageway 1278 is disposed between partition plates 1274 and 1280, the plates not orientated in parallel planes. The mixture then passes in an outwardly spiral pattern through fluid passageway 1278 to point 1282, and transfers through a port to fluid passageway 1284. Fluid passageway 1284 is disposed between partition plates 1280 and 1286, the plates not orientated in parallel planes. The mixture then moves in an inwardly spiral pattern through fluid passageway 1284 to point 1288, and passes through a port to fluid passageway 1290. Fluid passageway 1290 is disposed between partition plates 1286 and 1292, and planes 1286 and 1292 are not orientated in planes perpendicular with axial centerline 1252. The mixture then passes in an outwardly spiral pattern through fluid passageway 1290 to point 1294, and moves through a port into fluid passageway 1296. The mixture then travels in an inwardly spiral pattern through fluid passageway 1296 to point 1298, enters a discharge outlet 1300, and exits hydration vessel 1250 at point 1302, produced as slurry of partially or substantially hydrated material and water. While the embodiment illustrated in FIG. 35 shows an arrangement of a plurality of partition plates orientated in different planes, and other figures illustrate partition plates orientated in similar planes, the illustrations are merely examples, and the disclosure is not limited to those plate orientations described and shown. It will be appreciated that any suitable orientation is within the scope of the disclosure.

Some embodiments shown in the illustrations and described above depict partition plates, or surfaces, which substantially separate a continuous channel, or fluid passageway, from another continuous channel, or fluid passageway, while allowing the channels or passageways to be in fluid communication with each other, as well as an inlet and outlet of the apparatus. While plates are shown, other structures which would enable the same balance of separation and adequate fluid communication may be utilized, such as baffles, or any other structure which serves as a flow-directing vane or panel. Further, while continuous channels or passageways are depicted as connected by ports, continuous channels could also be in the form of augers, a series of augers, or any other suitable structure which enable the mixture to be hydrated, suspended, or dissolved by traveling through the apparatus in a distance greater than the length of the perimeter of the apparatus.

Further, while the foregoing examples and figures describe continuous channels or fluid passageways which are formed within the chambers or interior of the enclosures with a continuous wall or partition configuration, embodiments of the disclosure are not limited to only such designs, and it is well within the scope of the disclosure to have such channels or passageways constructed by any suitable design, such as pipe, conduit, square tubular, and the like. Additionally, components of the apparatus described may be constructed of any suitable material or combinations thereof, including, but not limited to metal, plastic, composites, etc. Further, while it is general shown that apparatus of the disclosure include a port for receiving a mixture, and a port for discharging a slurry, mixture or product, some alternative embodiments may include ports on the periphery of the apparatus for various purposes, including, sampling, monitoring, controlling, injecting other materials into the mixture during movement through the apparatus, and the like.

Also within the scope of the disclosure are methods for treating at least a portion of a subterranean formation penetrated by a wellbore, which include introducing into one or more reaction vessels (such as those vessels and apparatus described herein) a mixture of a liquid component containing a first chemical reactant, and a second chemical reactant, and the mixture is passed through the at least one reaction vessel. A treatment fluid is then prepared and contains the mixture and an optional insoluble particle, and subsequently introduced into a wellbore. The reaction vessel has a first enclosure having an outer perimeter and an interior space defined therein, a channel disposed in the interior space, a first port disposed on a surface of the first enclosure at or proximate to a first end of the channel, and a second port disposed on a surface of the first enclosure at or proximate to a second end of the channel. The channel may have a length greater than a shortest distance between the first port and the second port, and the first port and the second port are in fluid communication. In some cases, the channel has a length greater than a length of the outer perimeter, and the channel has an archimedian spiral pattern. The reaction vessel, as well as any vessels and apparatus according to the disclosure, may further include at least one static mixing element within the channel, an axial mixer within the vessel, or combination of both. The mixture produced in the vessel may be injected into a high pressure fluid stream, and in some instances, the mixture injected is a pill comprising a high concentration of the second chemical reactant.

The second chemical reactant may be a water hydratable material, or otherwise water reactable material, and the liquid component may be aqueous based including water as a first chemical reactant. The mixture may undergo a rate limited chemical reaction requiring residence time, while flowing the mixture through the reaction vessel under the influence of gravity, pressure or combination thereof. The concentration of water reactable material may be any suitable concentration, including, but not limited to about 25 pounds per 1000 gallons of liquid component or greater, about 30 pounds per 1000 gallons of liquid component or great, about 40 pounds per 1000 gallons of liquid component or greater, or even about 50 pounds per 1000 gallons of liquid component or greater.

The method may further include decreasing the concentration of the first chemical reactant, the second chemical reactant, or both, during the course of the treatment. Such a decrease in concentration may enable improved flushing and cleaning of the vessel and overall system. In some aspects, pressure change of the mixture is measured across the at least one reaction vessel to monitor a reaction of the first chemical reactant with the second chemical reactant. Also, the mixture may be passed through a plurality of such reaction vessels.

Some methods may further include use of a second enclosure having an outer perimeter and an interior space defined therein, where the second enclosure has a second channel disposed in the interior space, a third port disposed on a surface of the second enclosure at or proximate to a first end of the second channel, and a fourth port disposed on a surface of the second enclosure at or proximate to a second end of the second channel. The second port, the third port and fourth port are in fluid communication. The channel of the first enclosure and the second channel may have an archimedian spiral pattern, where a first fluid flowpath is in a progressively inward direction through the channel of the first enclosure, and a second fluid flowpath is in a progressively outward direction through the second channel, or alternatively, a first fluid flowpath is in a progressively outward direction through the channel of the first enclosure, and a second fluid flowpath is in a progressively inward direction through the second channel. Such a change in direction of fluid flowpaths may impart energy into the mixture to further optimize the reaction of the two materials.

In yet other methods, a plurality of enclosures is used, or any suitable number thereof, where each of the enclosures has an outer perimeter and an interior space defined therein, a channel disposed in the interior space, a port disposed on a surface of the enclosure at or proximate to a first end of the channel, and a port disposed on a surface of the enclosure at or proximate to a second end of the channel, and wherein the channel has a length greater than a shortest distance between the ports, and wherein the second port and the ports disposed on the surface of the plurality of enclosures are in fluid communication. One or more additional chemical components are injected into the plurality of reaction vessels at one or more points downstream from the first port.

Some other method embodiments according to the disclosure include methods for treating at least a portion of a subterranean formation penetrated by a wellbore where a liquid component including water and a second component having a hydratable polymer are introduced into at least one hydration vessel, the mixture passed through the at least one hydration vessel in a continuous manner to form a slurry, a treatment fluid then prepared which contains the slurry and an optional insoluble particle, and the treatment fluid introduced into the wellbore. The hydration vessel includes an inlet chamber having a spiraling first fluid passageway, and a discharge chamber having a spiraling second fluid passageway, where the first fluid passageway and the second fluid passageway are in fluid communication. A first fluid flowpath may be orientated in a progressively inward direction through the first fluid passageway, and a second fluid flowpath in a progressively inward direction through the second fluid passageway. The alternative may be the case as well, where the first fluid flowpath may be orientated in a progressively outward direction, and the second fluid flowpath in a progressively outward direction. The hydration vessel may further include an inlet port disposed on a perimeter of the inlet chamber, and a discharge port disposed on a perimeter of the discharge chamber. Some method embodiments also involve utilizing a plurality of hydration vessels connected in a series configuration, a parallel configuration, or combination thereof.

In some of the methods, the hydration vessel may further include at least one intermediate chamber disposed between the inlet chamber and the discharge chamber, where the at least one intermediate chamber comprises a spiraling first intermediate fluid passageway, and the first fluid passageway, the second fluid passageway, and the first intermediate fluid passageway are in fluid communication. In some cases, the at least one intermediate chamber is at least one pair of intermediate chambers disposed between the inlet chamber and the discharge chamber, the pair of intermediate chambers including a first intermediate chamber having a spiraling first intermediate fluid passageway, and a second intermediate chamber having a spiraling second intermediate fluid passageway, where the first fluid passageway, the second fluid passageway, the first intermediate fluid passageway and the second intermediate fluid passageway are in fluid communication. A second pair of intermediate chambers may further be disposed between the at least one pair of intermediate chambers and the discharge chamber, a third pair of intermediate chambers disposed between the second pair of intermediate chambers and the discharge chamber, a fourth pair of intermediate chambers disposed between the third pair of intermediate chambers and the discharge chamber, and so on. Any practical number of intermediate chambers, or pairs thereof, are within the scope and spirit of the disclosure.

In some aspects, at least one intermediate chamber is disposed between the inlet chamber and the discharge chamber, where the intermediate chamber comprises a spiraling first intermediate fluid passageway, and the first fluid passageway, the second fluid passageway, and the first intermediate fluid passageway are in fluid communication. Optionally, the at least one intermediate chamber is at least one pair of intermediate chambers disposed between the inlet chamber and the discharge chamber, and have a first intermediate chamber comprising a spiraling first intermediate fluid passageway, and a second intermediate chamber comprising a spiraling second intermediate fluid passageway, where the first fluid passageway, the second fluid passageway, the first intermediate fluid passageway and the second intermediate fluid passageway are in fluid communication. The at least one intermediate chamber may include a first and a second fluid passageway, where the fluid passageways are partitioned by a plate having a hole therein, and where the first and the second fluid passageways are in fluid communication. Also, the first outer chamber and the second outer chamber may each have a first and a second fluid passageway, where the fluid passageways are partitioned by a plate having a hole therein, and where the first and the second fluid passageway are in fluid communication.

Yet other method aspects of the disclosure relate to preparing a product from an admixture of a first chemical contained in a liquid component, and a second component. The first chemical may be the same as the liquid component in some cases, while in other cases, a chemical suspended or dissolved in the liquid component. The admixture mixture includes one or more materials that may react in any way, such as polymer, surfactant or solids separation and association with water in hydration, or even chemical reaction to form another material through ionic or covalent bonding. The admixture is introduced into an apparatus including an inlet chamber (such as 110 of FIG. 1, referenced as one example) having an outer perimeter 114 and a first fluid passageway 162 formed therein, where the first fluid passageway has a length greater than a shortest distance between the outer perimeter and center of the inlet chamber. The admixture may be introduced into the first fluid passageway through a port, such as 112 or 162, flowed through the first fluid passageway, to then exit and then enter a discharge, or otherwise second chamber of the apparatus, through another port. The discharge chamber includes an outer perimeter and a second fluid passageway formed therein, and the second fluid passageway has a length greater than a shortest distance between the outer perimeter and center of the discharge chamber. The first fluid passageway and the second fluid passageway are in fluid communication. The admixture is flowed through the apparatus and discharged from the apparatus as a product formed from the first chemical and the second component. The direction of admixture flow through the first fluid passageway and the second fluid passageway may be in opposite directions in some aspects, different directions in other aspects, or even in like directions. Ports may be disposed at any practical position upon and/or within the combination of chambers. The chambers may be formed within separate enclosures, or formed within a single enclosure. The apparatus may also include additional chambers as well.

Apparatus and methods of the disclosure may be useful in subterranean formation treatments where continuous mixing and hydration of well viscous treatment gels from dry polymer are required at a wellbore site, whether land based or offshore. However, the processes and apparatus may however be used for mixing other types of powder material with liquids as well. At a wellbore site once the well has been drilled and constructed and the drill rig removed, the site may be prepared for subterranean formation treatment or stimulation. The surface, or rig facilities and layout typically involve a number of pieces of mobile equipment including fracture fluid storage tanks, sand storage units, chemical trucks, blending equipment and pumping equipment. All facets of the hydraulic fracturing job from the blending and pumping of the fracture fluids and proppants—solid material, usually sand or other solid material, that is pumped into fractures to hold them open—to the way the rock formation responds to the fracturing, are often managed from a single control location. Apparatus of the disclosure may be a component of the blending equipment, and in fluid communication with pumping equipment. Integration of the apparatus and methods into the formation treatment equipment set up will be readily apparent to those of skill in the art having the benefit of this disclosure.

Lastly, in accordance with the disclosure, the hydratable polymer may be present at any suitable concentration in the mixture or produced slurry. In various embodiments hereof, the hydratable polymer can be present in an amount of from about 0.1 wt. % to about 10 wt. % of total weight of the mixture, from about 0.1 wt. % to about 7 wt. % of total weight of the mixture, from about 0.1 wt. % to about 5 wt. % of total weight of the mixture, from about 0.1 wt. % to about 4 wt. % of total weight of the mixture, from about 0.1 wt. % to about 3 wt. % total weight of the mixture, from about 0.1 wt. % to about 2 wt. % of total weight of the mixture, or even from about 0.1 wt. % to about 1 wt. % of total weight of the mixture. Slurries incorporating the hydratable polymer may have any suitable viscosity, and in some instances a viscosity value of about 50 mPa-s or greater at a shear rate of about 100 $s^{-1}$ at treatment temperature, or about 75 mPa-s or greater at a shear rate of about $100^{s-1}$, or even about 100 mPa-s or greater at a shear rate of about 100 $s^{-1}$.

The foregoing description of the embodiments has been provided for purposes of illustration and description. Example embodiments are provided so that this disclosure will be thorough, and will fully convey the scope to those who are skilled in the art. Numerous specific details are set forth such as examples of specific components, devices, and methods, to provide a thorough understanding of embodiments of the disclosure, but are not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although various embodiments have been described with respect to enabling disclosures, it is to be understood the invention is not limited to the disclosed embodiments. Variations and modifications that would occur to one of skill in the art upon reading the specification are also within the scope of the invention, which is defined in the appended claims.

What is claimed is:

1. An apparatus comprising:
 a first enclosure having an outer perimeter and an interior space defined therein, the first enclosure comprising:
  a first continuous channel in the interior space defining a first fluid flowpath and having a channel-length greater than a length of the outer perimeter of the first enclosure;
  a first port disposed on a surface of the first enclosure in fluid communication with a first end of the first continuous channel; and
  a second port disposed at or proximate to a second end of the first continuous channel; and,
 a second enclosure having an outer perimeter and an interior space defined therein, the second enclosure comprising:
  a second continuous channel in the interior space defining a second fluid flowpath and having a channel-length greater than a length of the outer perimeter of the second enclosure;
  a third port disposed at or proximate to a first end of the second continuous channel; and a fourth port disposed on a surface of the second enclosure in fluid communication with a second end of the second continuous channel;

wherein the second port and the third port are in fluid communication, and wherein one of the first fluid flowpath and the second fluid flowpath is in a progressively inward direction through the continuous channel thereof and wherein the other one of the first fluid flowpath and the second fluid flowpath is in a progressively outward direction through the continuous channel thereof.

2. The apparatus of claim 1 wherein the first enclosure further comprises:
a third continuous channel in the interior space having a channel-length greater than the length of the outer perimeter of the first enclosure;
a first end of the third continuous channel disposed at or proximate to a port; and
a fifth port disposed at or proximate to a second end of the third continuous channel;
wherein the second port, the third port, and the fifth port are in fluid communication.

3. The apparatus of claim 2 wherein the first enclosure further comprises at least one pair of continuous channels in the interior space, the pair continuous channels comprising:
a fourth continuous channel having a channel-length greater than a length of the outer perimeter of the first enclosure, a first end at or proximate to a port, and a sixth port disposed at or proximate to a second end; and
a fifth continuous channel having a channel-length greater than a length of the outer perimeter of the first enclosure, a first end at or proximate to the sixth port, and a seventh port disposed at or proximate to a second end;
wherein the second port, the third port, the fifth port, the sixth port and the seventh port are in fluid communication.

4. The apparatus of claim 3 wherein the first enclosure further comprises two pair of continuous channels in the interior space.

5. The apparatus of claim 1 further comprising a pair of intermediate enclosures disposed between the first enclosure and the second enclosure, the pair of intermediate enclosures comprising:
a first intermediate enclosure having an outer perimeter and an interior space defined therein, the first intermediate enclosure comprising:
a continuous channel in the interior space having a channel-length greater than a length of the outer perimeter of the first intermediate enclosure;
a port disposed on a surface of the first intermediate enclosure in communication with a first end of the continuous channel; and
a port disposed on a surface of the first intermediate enclosure and located proximate the outer perimeter, the port in communication with a second end of the continuous channel; and,
a second intermediate enclosure having an outer perimeter and an interior space defined therein, the second intermediate enclosure comprising:
a continuous channel in the interior space having a channel-length greater than a length of the outer perimeter of the second intermediate enclosure;
a port disposed on a surface of the second intermediate enclosure and located proximate the outer perimeter, the port in communication with a first end of the continuous channel and connected to the port disposed on the first intermediate enclosure in communication with the second end of the continuous channel of the first intermediate enclosure; and
a port disposed on a surface of the second intermediate enclosure and located proximate the outer perimeter, the port in communication with a second end of the continuous channel.

6. The apparatus of claim 5 further comprising a second pair of intermediate enclosures disposed between the pair of intermediate enclosures and the second enclosure.

7. The apparatus of claim 6 further comprising a third pair of intermediate enclosures disposed between the second pair of intermediate enclosures and the second enclosure.

8. The apparatus of claim 7 further comprising a fourth pair of intermediate enclosures disposed between the third pair of intermediate enclosures and the second enclosure.

9. The apparatus of claim 5 further comprising a plurality of pairs of intermediate enclosures disposed between the first enclosure and the second enclosure.

10. The apparatus of claim 1 wherein the first port is a fluid inlet and the fourth port is a fluid outlet, and wherein the first port and the fourth port are in fluid communication.

11. The apparatus of claim 5 wherein the first enclosure, the second enclosure, the first intermediate enclosure and the second intermediate enclosure are substantially circular or ovate in outer perimeter shape.

12. The apparatus of claim 11 wherein the continuous channels of the first enclosure, the second enclosure, the first intermediate enclosure and the second intermediate enclosure are orientated in a substantially spiral configuration.

13. The apparatus of claim 12 wherein the first fluid flowpath is in a progressively inward direction through the continuous channels of the first enclosure and the second intermediate enclosure, and wherein the second fluid flowpath is in a progressively outward direction through the continuous channels of the second enclosure and the first intermediate enclosure.

14. The apparatus of claim 13 wherein the first fluid flowpath is counterclockwise and the second fluid flowpath is clockwise.

15. The apparatus of claim 13 wherein the first fluid flowpath is clockwise and the second fluid flowpath is counterclockwise.

16. The apparatus of claim 5 wherein first enclosure, the second enclosure, the first intermediate enclosure and the second intermediate enclosure are substantially rectangular in outer perimeter shape.

17. The apparatus of claim 16 wherein a first fluid flowpath is in a progressively inward direction through the continuous channels of the first enclosure and the second intermediate enclosure, and wherein a second fluid flowpath is in a progressively outward direction through the continuous channels of the second enclosure and the first intermediate enclosure.

18. The apparatus of claim 1 wherein the first port is configured to receive a mixture comprising a hydratable polymer and a liquid, and whereby the fourth port is configured to produce a slurry of the hydratable polymer and the liquid.

19. The apparatus of claim 1 as used in a method of hydrating a mixture of water and a hydratable material.

20. A hydration vessel comprising:
an inlet chamber having an outer perimeter and a first fluid passageway formed therein, wherein the length of the first fluid passageway is greater than a length of the outer perimeter and wherein the first fluid passageway is inwardly spiraling; and a discharge chamber having an outer perimeter and a second fluid passageway formed therein, wherein the length of the second fluid passageway is greater than a length of the outer perimeter and wherein the second fluid passageway is spiraling;

wherein the inlet chamber further comprises a third fluid passageway formed therein, wherein the length of the third fluid passageway is greater than the length of the outer perimeter, wherein the third fluid passageway is outwardly spiraling, and wherein the first fluid passageway, the second fluid passageway, and the third fluid passageway are in fluid communication.

21. The hydration vessel of claim 20 wherein the inlet chamber further comprises at least one pair of fluid passageways in the interior space, the pair of fluid passageways comprising:
   a fourth fluid passageway having a channel-length greater than a length of the outer perimeter, wherein the fourth fluid passageway is inwardly spiraling; and
   a fifth fluid passageway having a channel-length greater than a length of the outer perimeter, wherein the fifth fluid passageway is outwardly spiraling;
wherein the first fluid passageway, the second fluid passageway, the third fluid passageway, the fourth fluid passageway and the fifth fluid passageway are in fluid communication.

22. The hydration vessel of claim 21 wherein the inlet chamber comprises two pair of fluid passageways in the interior space.

23. The hydration vessel of claim 20 further comprising an inlet port disposed on the perimeter of the inlet chamber, and a discharge port disposed on an outer surface of the discharge chamber.

24. The hydration vessel of claim 20 further comprising at least one intermediate chamber disposed between the inlet chamber and the discharge chamber.

25. The hydration vessel of claim 24 wherein the at least one intermediate chamber is a pair of intermediate chambers comprising:
   a first intermediate chamber having an outer perimeter and a first intermediate fluid passageway formed therein, wherein the length of the first intermediate fluid passageway is greater than a length of the outer perimeter and wherein the first fluid passageway is outwardly spiraling; and,
   a second intermediate chamber having an outer perimeter and a second intermediate fluid passageway formed therein, wherein the length of the second intermediate fluid passageway is greater than a length of the outer perimeter and wherein the second fluid passageway is inwardly spiraling.

26. The hydration vessel of claim 25 wherein:
   the inlet chamber further comprises an inlet port disposed on the perimeter of the inlet chamber, the inlet port in fluid communication with an end of the first fluid passageway;
   the first intermediate chamber further comprising an inlet port disposed on a first surface of the first intermediate chamber and in communication with a first end of the first intermediate fluid passageway;
   the first intermediate chamber further comprising an outlet port disposed on a second surface of the first intermediate chamber and in communication with a second end of the first intermediate fluid passageway;
   the second intermediate chamber further comprising an inlet port disposed on a first surface of the second intermediate chamber and in communication with a first end of the second intermediate fluid passageway;
   the second intermediate chamber further comprising an outlet port disposed on a second surface of the second intermediate chamber and in communication with a second end of the second intermediate fluid passageway; and,
   the discharge chamber further comprising an inlet port disposed on a surface of the discharge chamber in communication with an end of the second fluid passageway.

27. The hydration vessel of claim 26 further comprising a second pair of intermediate chambers disposed between the at least one pair of intermediate chambers and the discharge chamber.

28. The hydration vessel of claim 27 further comprising a third pair of intermediate chambers disposed between the second pair of intermediate chambers and the discharge chamber.

29. The hydration vessel of claim 28 further comprising a fourth pair of intermediate chambers disposed between the third pair of intermediate chambers and the discharge chamber.

30. The hydration vessel of claim 24 wherein the inlet chamber, the discharge chamber, and the at least one intermediate chamber each comprise a first and a second fluid passageway, wherein the fluid passageways are partitioned by a plate having a hole therein, and wherein the first and the second fluid passageway are in fluid communication.

31. The hydration vessel of claim 20 wherein the inlet chamber and the discharge chamber are substantially circular or ovate in outer perimeter shape.

32. The hydration vessel of claim 20 wherein the inlet chamber and the discharge chamber are substantially rectangular in outer perimeter shape.

33. The hydration vessel of claim 20 wherein the inlet port is configured to receive a mixture comprising a hydratable material and a liquid, and whereby the discharge port is configured to produce a slurry of the hydratable material and the liquid.

34. A hydration system comprising a plurality of hydration vessels according to claim 20, the hydration vessels connected in a series configuration.

35. A hydration system comprising a plurality of hydration vessels according to claim 20, the hydration vessels connected in a parallel configuration.

36. A hydration vessel comprising:
   a first outer chamber including an inlet port, a second outer chamber including a discharge port, and at least one intermediate chamber including a first port and a second port, the at least one intermediate chamber disposed between the first outer chamber and the second outer chamber;
wherein the first outer chamber, the second outer chamber, and the at least one intermediate chamber each have a perimeter and contain at least one continuous channel therein, each continuous channel having a length greater than a length of the perimeter, each continuous channel disposed substantially parallel with each of the perimeters, and each continuous channel defining a fluid flowpath therein, and
wherein the inlet port, the discharge port, and the continuous channels are in fluid communication, and wherein the fluid flowpaths alternate between a progressively inward direction and a progressively outward direction.

37. The hydration vessel of claim 36 wherein the at least one intermediate chamber is at least one pair of intermediate chambers.

38. The hydration vessel of claim 37 further comprising a second pair of intermediate chambers disposed between the at least one pair of intermediate chambers and the second outer chamber.

39. The hydration vessel of claim 38 further comprising a third pair of intermediate chambers disposed between the second pair of intermediate chambers and the second outer chamber.

40. The hydration vessel of claim 39 further comprising a fourth pair of intermediate chambers disposed between the third pair of intermediate chambers and the second outer chamber.

41. The hydration vessel of claim 36 wherein the first outer chamber, the second outer chamber, and the at least one intermediate chamber each comprise a first and a second continuous channel, wherein the continuous channels are partitioned by a plate having a hole therein, and wherein the first and the second continuous channel are in fluid communication.

42. The hydration vessel of claim 41 wherein the first fluid flowpath is in a progressively inward direction through the first continuous channel, and wherein the second fluid flowpath is in a progressively outward direction through the second continuous channel.

43. The hydration vessel of claim 42 wherein the first and second continuous channels are orientated in a substantially spiral configuration.

44. The hydration vessel of claim 36 wherein the first outer chamber, the at least one intermediate chamber, and the second outer chamber are substantially circular or ovate in outer perimeter shape.

45. The hydration vessel of claim 44 wherein the at least one intermediate chamber is a pair of intermediate chambers comprising a first intermediate chamber and a second intermediate chamber, and wherein the continuous channels in the first outer chamber, the second outer chamber, and each of the pair of intermediate chambers are orientated in a spiral configuration.

46. The hydration vessel of claim 45 wherein a fluid flowpath is in a progressively inward direction through the continuous channels of the first outer chamber and the second intermediate chamber, and wherein a second fluid flowpath is in a progressively outward direction through the continuous channels of the second outer chamber and the first intermediate chamber.

47. The hydration vessel of claim 36 wherein the first outer chamber, the at least one intermediate chamber, and the second outer chamber are substantially rectangular in outer perimeter shape.

48. The hydration vessel of claim 47 wherein the at least one intermediate chamber is a pair of intermediate chambers comprising a first intermediate chamber and a second intermediate chamber.

49. The hydration vessel of claim 48 wherein a fluid flowpath is in a progressively inward direction through the continuous channels of the first outer chamber and the second intermediate chamber, and wherein a second fluid flowpath is in a progressively outward direction through the continuous channels of the second outer chamber and the first intermediate chamber.

50. The hydration vessel of claim 36 wherein the inlet port is configured to receive a mixture comprising a hydratable material and a liquid, and whereby the outlet port is configured to produce a slurry of the hydratable material and the liquid.

51. The hydration vessel of claim 36 further comprising a pair of intermediate chambers disposed between the first outer chamber and the at least one intermediate chamber, wherein each intermediate chamber of the pair of intermediate chambers have a perimeter and contain at least one continuous channel therein, each continuous channel having a length greater than a length of the perimeter, and each continuous channel disposed substantially parallel with each of the perimeters, and wherein the inlet port, the discharge port, and the continuous channels are in fluid communication.

52. The hydration vessel of claim 51 further comprising a second pair of intermediate chambers disposed between the pair of intermediate chambers and the second outer chamber, wherein each intermediate chamber of the second pair of intermediate chambers has a perimeter and contains at least one continuous channel therein, each continuous channel having a length greater than a length of the perimeter, and each continuous channel disposed substantially parallel with each of the perimeters, and wherein the inlet port, the discharge port, and the continuous channels are in fluid communication.

53. The hydration vessel of claim 52 further comprising a third pair of intermediate chambers disposed between the second pair of intermediate chambers and the second outer chamber, wherein each intermediate chamber of the third pair of intermediate chambers has a perimeter and contains at least one continuous channel therein, each continuous channel having a length greater than a length of the perimeter, and each continuous channel disposed substantially parallel with each of the perimeters, and wherein the inlet port, the discharge port, and the continuous channels are in fluid communication.

54. The hydration vessel of claim 36 as used in a method of hydrating a mixture of water and hydratable material.

55. A hydration system comprising a plurality of hydration vessels according to claim 36, the hydration vessels connected in a series configuration.

56. A hydration system comprising a plurality of hydration vessels according to claim 36, the hydration vessels connected in a parallel configuration.

57. A reaction vessel comprising:
a first enclosure having an outer perimeter and an interior space defined therein;
a channel disposed in the interior space;
a first port disposed on a surface of the first enclosure at or proximate to a first end of the channel; and,
a second port disposed on a surface of the first enclosure at or proximate to a second end of the channel;
wherein the channel has a length greater than a shortest distance between the first port and the second port, and wherein the first port and the second port are in fluid communication, and
wherein a first fluid flowpath is in a progressively radially inward direction through the channel of the first enclosure, and wherein a second fluid flowpath is in a progressively radially outward direction through the second channel.

58. The reaction vessel of claim 57 wherein the channel has a length greater than a length of the outer perimeter.

59. The reaction vessel of claim 57 further comprising a second enclosure having an outer perimeter and an interior space defined therein, the second enclosure comprising:
- a second channel disposed in the interior space;
- a third port disposed on a surface of the second enclosure at or proximate to a first end of the second channel; and
- a fourth port disposed on a surface of the second enclosure at or proximate to a second end of the second channel;

wherein the second port, the third port and fourth port are in fluid communication.

60. The reaction vessel of claim 59 wherein the channel has a length greater than a length of the outer perimeter.

61. The reaction vessel of claim 57 wherein the first fluid flowpath is counterclockwise and the second fluid flowpath is clockwise.

62. The reaction vessel of claim 57 wherein the first fluid flowpath is clockwise and the second fluid flowpath is counterclockwise.

63. The reaction vessel of claim 57 further comprising a plurality of enclosures, wherein each of the plurality of enclosures comprise:
- an outer perimeter and an interior space defined therein;
- a channel disposed in the interior space;
- a port disposed on a surface of the enclosure at or proximate to a first end of the channel; and
- a port disposed on a surface of the enclosure at or proximate to a second end of the channel; and, wherein the channel has a length greater than a shortest distance between the ports;

wherein the second port and the ports disposed on the surface of the plurality of enclosures are in fluid communication.

64. The reaction vessel of claim 63 wherein the channels have a length greater than a length of the outer perimeters.

65. The reaction vessel of claim 57 wherein the enclosure is substantially circular, ovate or rectangular in outer perimeter shape.

66. The reaction vessel of claim 57 wherein the channel is orientated in a substantially spiral configuration.

67. The reaction vessel of claim 57 further comprising at least one static mixing element disposed within the channel.

68. The reaction vessel of claim 57 wherein the first port is disposed on a peripheral surface of the first enclosure.

69. The reaction vessel of claim 57 wherein the second port is disposed on a peripheral surface of the first enclosure.

70. A system comprising a plurality of reaction vessels according to claim 57, the reaction vessels connected in a series configuration.

71. A system comprising a plurality of reaction vessels according to claim 57, the reaction vessels connected in a parallel configuration.

* * * * *